US010121226B2

(12) United States Patent
Masuko et al.

(10) Patent No.: US 10,121,226 B2
(45) Date of Patent: Nov. 6, 2018

(54) INFORMATION PROCESSING DEVICE, INFORMATION PROCESSING METHOD, AND INFORMATION PROCESSING PROGRAM

(71) Applicant: Rakuten, Inc., Tokyo (JP)

(72) Inventors: Soh Masuko, Tokyo (JP); Hiromi Hirano, Tokyo (JP); Naoki Ogawa, Tokyo (JP); Rikio Onai, Tokyo (JP); Makoto Okabe, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 15/528,312

(22) PCT Filed: Nov. 21, 2014

(86) PCT No.: PCT/JP2014/080932
§ 371 (c)(1),
(2) Date: May 19, 2017

(87) PCT Pub. No.: WO2016/079868
PCT Pub. Date: May 26, 2016

(65) Prior Publication Data
US 2017/0323425 A1 Nov. 9, 2017

(51) Int. Cl.
*G06K 9/34* (2006.01)
*G06T 3/40* (2006.01)
(Continued)

(52) U.S. Cl.
CPC .......... *G06T 3/403* (2013.01); *G06K 9/00456* (2013.01); *G06K 9/325* (2013.01); *G07G 1/14* (2013.01)

(58) Field of Classification Search
CPC .... G06K 9/00456; G06K 9/325; G06T 3/403; G09G 3/20; G09G 5/00; G09G 5/26;
(Continued)

(56) References Cited

U.S. PATENT DOCUMENTS

| 6,577,762 | B1 * | 6/2003 | Seeger | ............. G06K 9/38 382/173 |
| 2002/0064307 | A1 * | 5/2002 | Koga | ............. G06T 3/40 382/176 |

(Continued)

FOREIGN PATENT DOCUMENTS

| EP | 1 600 939 A1 | 11/2005 |
| EP | 2 728 571 A1 | 5/2014 |

(Continued)

*Primary Examiner* — Mekonen Bekele
(74) *Attorney, Agent, or Firm* — Sughrue Mion, PLLC

(57) ABSTRACT

An information processing device sets a second scaling factor used to display a character image extracted from an image. The second scaling factor is different from a first scaling factor used to display a background image extracted from the image. The information processing device adjusts at least either the character image changed in display size with the second scaling factor or the background image changed in display size with the first scaling factor, based on the relationship between the display state of the character image changed in display size and the display state of the surrounding area of the character image that has been changed in display size and is overlaid on the background image changed in display size.

12 Claims, 25 Drawing Sheets

(51) Int. Cl.
*G06K 9/00* (2006.01)
*G06K 9/32* (2006.01)
*G07G 1/14* (2006.01)

(58) Field of Classification Search
CPC ............ G09G 5/32; G09G 5/36; G09G 5/377;
G09G 2340/0407; G09G 2340/145; G07G
1/14
USPC .................................................. 382/176, 199
See application file for complete search history.

(56) References Cited

U.S. PATENT DOCUMENTS

| | | | |
|---|---|---|---|
| 2003/0021476 A1* | 1/2003 | Di Federico ....... | G06K 9/00456 382/176 |
| 2007/0160295 A1* | 7/2007 | Wang ................. | G06K 9/00456 382/199 |
| 2007/0292113 A1 | 12/2007 | Tsou et al. | |
| 2009/0324081 A1* | 12/2009 | Oh ..................... | G06K 9/00456 382/177 |
| 2011/0187727 A1* | 8/2011 | Ahn ................... | G06F 3/04883 345/473 |
| 2011/0200250 A1* | 8/2011 | Oh ..................... | G06K 9/3258 382/164 |
| 2014/0351350 A1* | 11/2014 | Lee .................... | H04L 51/16 709/206 |
| 2017/0270359 A1* | 9/2017 | Ouchi ................. | G06K 9/00463 |

FOREIGN PATENT DOCUMENTS

| | | | | |
|---|---|---|---|---|
| JP | WO 2011070793 A1 * | 6/2011 | ........... | H04N 7/0122 |
| JP | 2013-40976 A | 2/2013 | | |

\* cited by examiner

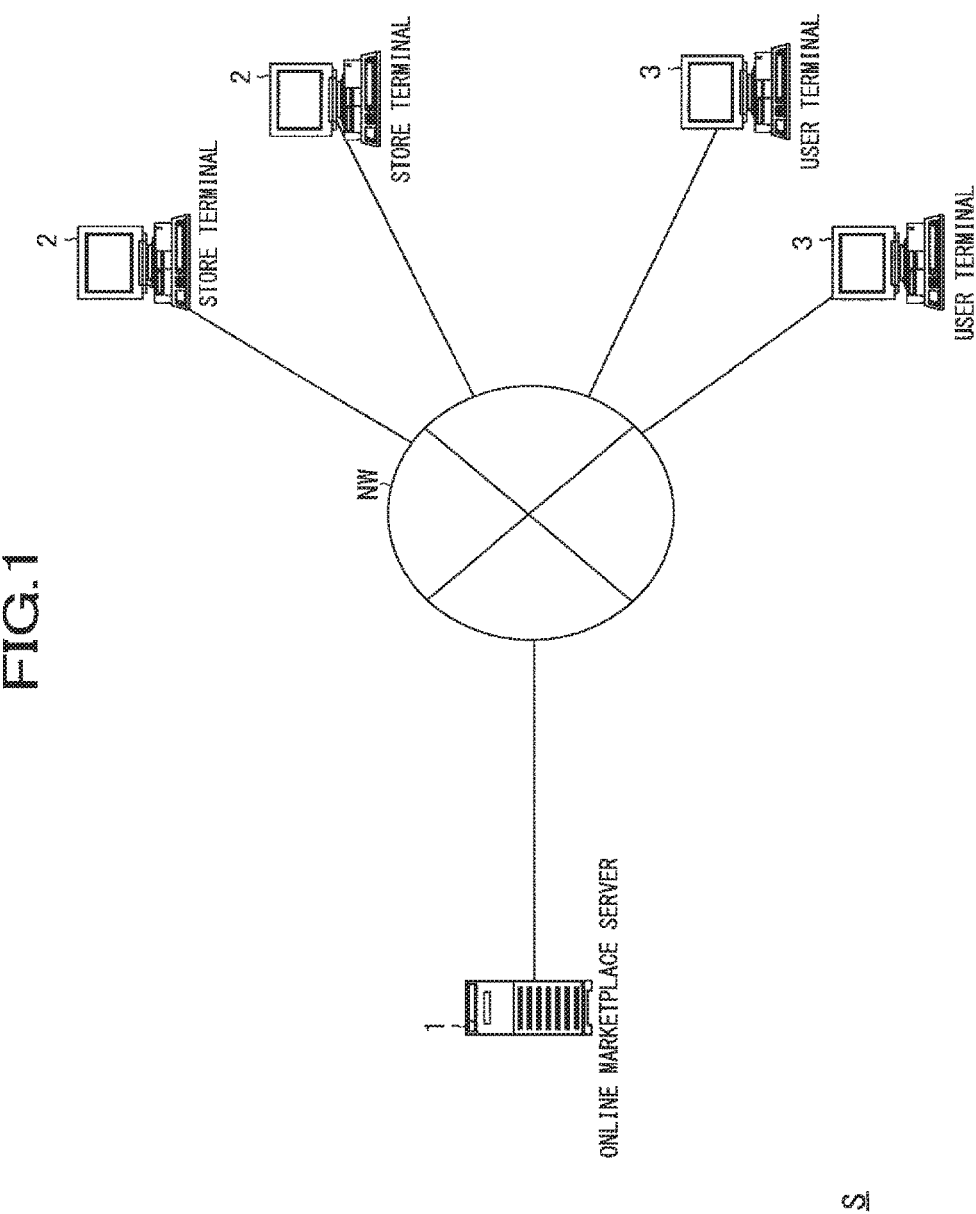

FIG.3A
MEMBER DB — 12a

| USER ID |
| --- |
| PASSWORD |
| NICKNAME |
| NAME |
| BIRTH DATE |
| GENDER |
| ZIP CODE |
| ADDRESS |
| TELEPHONE NUMBER |
| EMAIL ADDRESS |
| CREDIT CARD INFORMATION |
| . . . |

FIG.3B
ITEM DB — 12b

| STORE ID |
| --- |
| ITEM ID |
| PRODUCT CODE |
| TRADE NAME |
| ITEM DESCRIPTION |
| . . . |

FIG.3C
ITEM IMAGE DB — 12c

| ITEM ID |
| --- |
| IMAGE ID |
| ORIGINAL ITEM IMAGE |
| BACKGROUND IMAGE |
| CHARACTER IMAGE INFORMATION 1 |
| CHARACTER IMAGE INFORMATION 2 |
| . . . |

FIG.3D
CHARACTER IMAGE INFORMATION

| CHARACTER IMAGE |
| --- |
| ORIGINAL COORDINATES |
| LEVEL OF IMPORTANCE |
| TEXT |

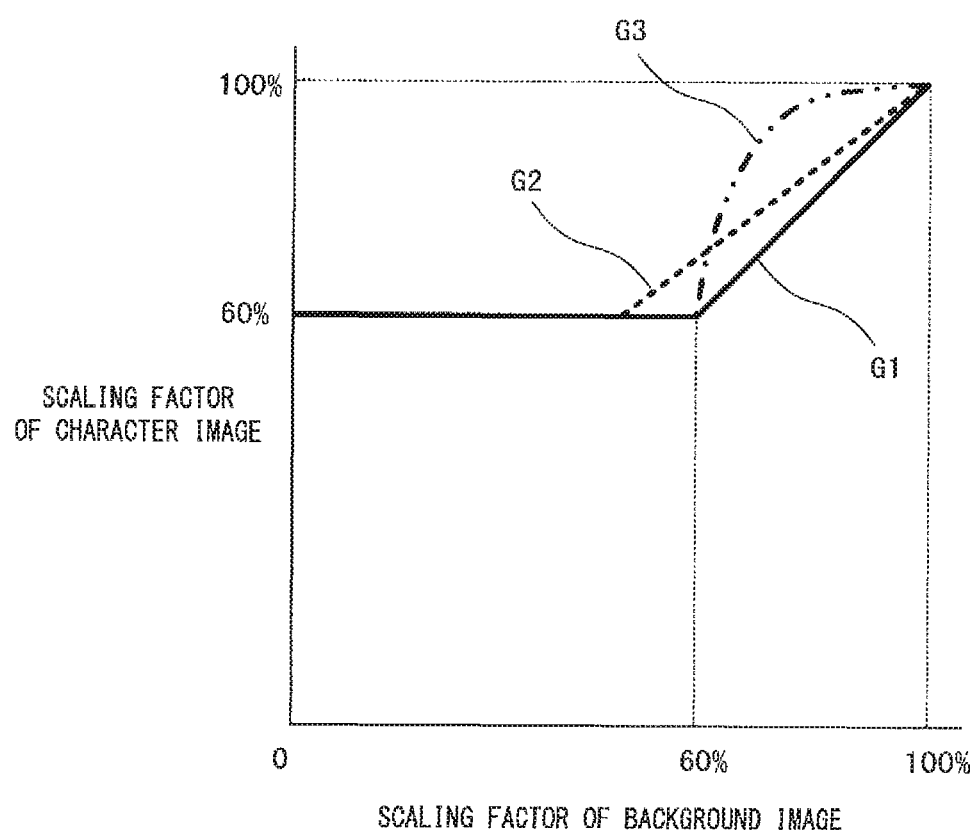

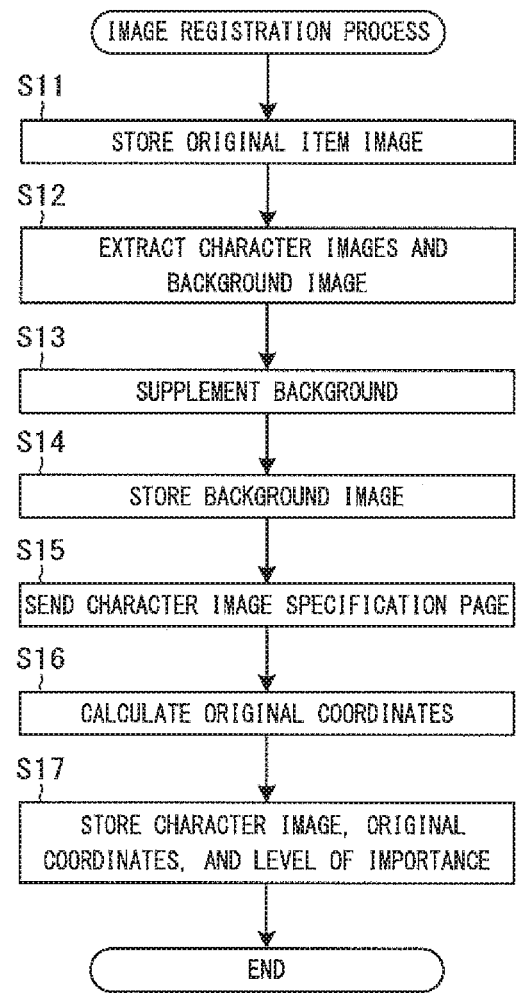

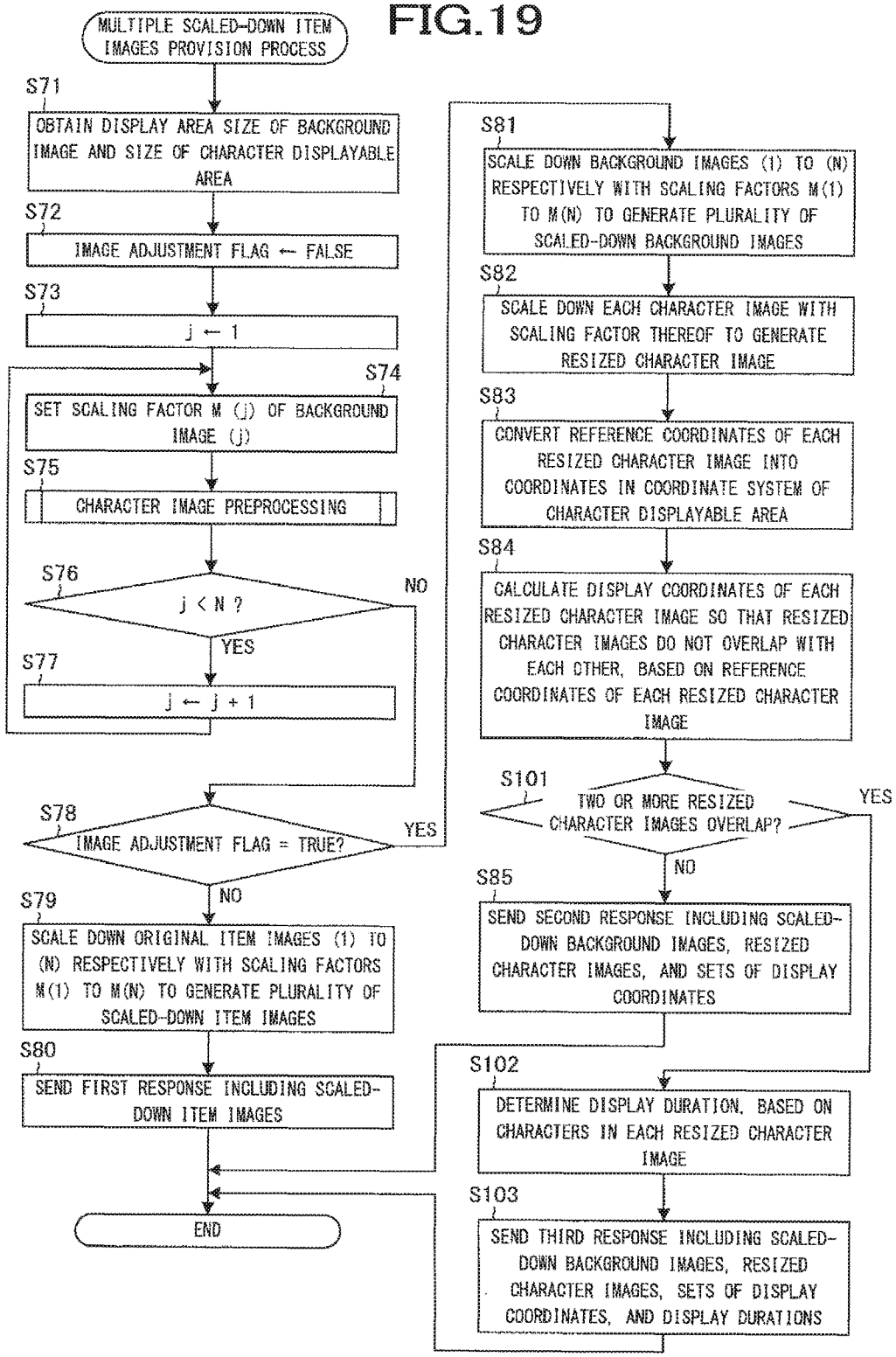

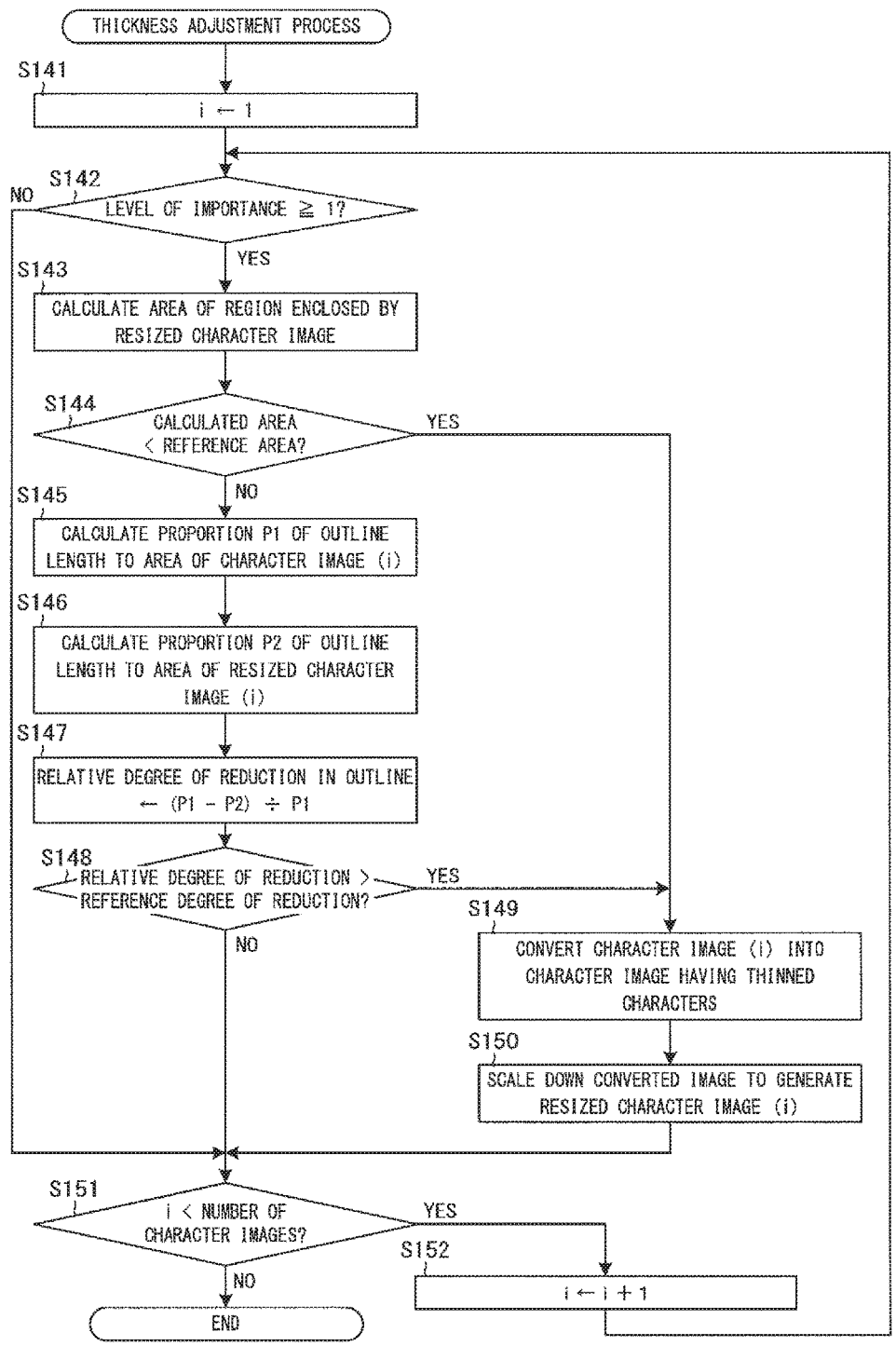

INFORMATION PROCESSING DEVICE, INFORMATION PROCESSING METHOD, AND INFORMATION PROCESSING PROGRAM

This application is a National Stage of International Application No. PCT/JP2014/080932 filed Nov. 21, 2014, the contents of all of which are incorporated herein by reference in their entirety.

TECHNICAL FIELD

The present invention relates to techniques for causing an image including a character image part to be displayed larger or smaller.

BACKGROUND ART

Conventionally, it is common to scale down an image and then display it, for example, as a thumbnail or cause it to be displayed on a small-sized screen. If such processing scales down an image including an image part that shows characters, the characters also become smaller. Accordingly, the legibility of the characters is reduced. To prevent reduction in the legibility, it is proposed to set the scale-down factor of a character image part in an image to be larger than the scale-down factor of a background image part and then superimpose the scaled down character image on the scaled down background image (e.g., Patent Literature 1).

CITATION LIST

Patent Literature

Patent Literature 1: JP 2013-40976 A

SUMMARY OF INVENTION

Technical Problem

However, the difference between the scale-down factor of a character image and the scale-down factor of a background image can deviate the positional relationship between character images and the positional relationship between a character image and a background image from their original positional relationships. The deviation of these positional relationships may cause a reduction in the legibility of characters shown by a scaled down character image. This is a problem that may arise not only when an character image is scaled down but also when a small character image is scaled up against a background image, that is, when the scaling factor of a character image part is set to be different from the scaling factor of a background image part in a displayed image.

In view of the above, it is an object of the present invention to provide an information processing device, an information processing method, and an information processing program that are capable of improving the legibility of characters shown by a character image part included in a displayed image in which the scaling factor of the character image part is set to be different from the scaling factor of a background image part.

Solution to Problem

To solve the above problem, the invention according to claim 1 includes setting means and adjusting means. The setting means sets a second scaling factor used to display a character image extracted from an image. The second scaling factor is different from a first scaling factor used to display a background image extracted from the image. The adjusting means adjusts at least either the character image changed in display size with the second scaling factor set by the setting means or the background image changed in display size with the first scaling factor, based on the relationship between the display state of the character image changed in display size and the display state of the surrounding area of the character image that has been changed in display size and is overlaid on the background image changed in display size.

According to this invention, an information processing device adjusts at least either a character image changed in display size with a second scaling factor or a background image changed in display size with a first scaling factor different from the second scaling factor, based on the relationship between the display state of the character image changed in display size and the display state of the surrounding area of the character image in the area where the character image changed in display size is overlaid on the background image changed in display size. The legibility of characters shown by the character image relates to the display state of the character image and the display state of the surrounding area of the character image. The information processing device makes the adjustment based on the relationship between these display states. This can improve the legibility of the characters shown by the character image part.

The invention according to claim 2 is the information processing device according to claim 1 in which when a plurality of character images are extracted from the image, the adjusting means adjusts the display position of at least one of the plurality of character images changed in display size with the second scaling factor so that these plurality of character images are positioned not to overlap.

According to this invention, the information processing device adjusts the display position so that the character images do not overlap. This makes the legibility of each character image higher than when the character images overlap.

The invention according to claim 3 is the information processing device according to claim 2 in which the setting means sets a second scaling factor used to display a plurality of character images extracted from a plurality of images. The second scaling factor is different from a first scaling factor used to display a plurality of background images extracted from the plurality of images. The adjusting means adjusts at least one first character image, among the plurality of character images changed in display size with the second scaling factor, so that the at least one first character image is positioned to partially extend out from the area for a first background image corresponding to the first character image, among the plurality of background images. The adjusting means then adjusts the display position of at least either the first character image or a second character image corresponding to a second background image different from the first background image, among the plurality of background images, so that the first and second character images do not overlap.

According to this invention, the information processing device allows a character image to extend out from the area for the background image. This can widen the area that can be used to adjust the display position. The information processing device also adjusts the display position so that the character image extending out from the area for the background image does not overlap with a character image displayed corresponding to another background image. This can improve the legibility of characters also when a plurality of images scaled down or up are displayed simultaneously.

The invention according to claim 4 is the information processing device according to any one of claims 1 to 3 in which when a plurality of character images are extracted from the image and two or more of the plurality of character images changed in display size with the second scaling factor overlap, the information processing device makes the display timings of at least the two or more character images different from each other.

According to this invention, when there are two or more character images overlapping with each other, the information processing device makes the display timings of these character images different from each other. This eliminates the overlap, thus improving the legibility of characters.

The invention according to claim 5 is the information processing device according to any one of claims 1 to 4 in which the adjusting means increases the difference in color between the edge of the character image changed in display size and a portion adjoining the edge in the background image changed in display size.

According to this invention, the boundary between the character image changed in display size and the background image changed in display size becomes clear. This can improve the legibility of characters.

The invention according to claim 6 is the information processing device according to any one of claims 1 to 5 further including second adjusting means. The second adjusting means adjusts the thickness of characters shown by the character image changed in display size, based on at least either the area of the region enclosed by the character image changed in display size or the relationship between the area of the character image changed in display size and the outline length of this character image.

The area of the region enclosed by the character image and the relationship between the area of the character image and the outline length of the character image each relate to how much characters shown by the character image changed in display size are squashed. According to this invention, the information processing device adjusts the thickness of the characters, based on information relating to how the characters are squashed. This can improve the legibility of the characters.

The invention according to claim 7 is the information processing device according to any one of claims 1 to 5 in which when the size of characters shown by the extracted character image is less than a reference value, the setting means sets the scaling factor of the character image to a scaling factor that makes the size of the characters greater than or equal to the reference value.

According to this invention, the information processing device causes originally small characters to be displayed larger. This can improve the legibility of the characters.

The invention according to claim 8 is an information processing method performed by a computer. The method includes the following steps. A second scaling factor used to display a character image extracted from an image is set. The second scaling factor is different from a first scaling factor used to display a background image extracted from the image. At least either the character image changed in display size with the set second scaling factor or the background image changed in display size with the first scaling factor is adjusted, based on the relationship between the display state of the character image changed in display size and the display state of the surrounding area of the character image that has been changed in display size and is overlaid on the background image changed in display size.

The invention according to claim 9 causes a computer to function as setting means and adjusting means. The setting means sets a second scaling factor used to display a character image extracted from an image. The second scaling factor is different from a first scaling factor used to display a background image extracted from the image. The adjusting means adjusts at least either the character image changed in display size with the second scaling factor set by the setting means or the background image changed in display size with the first scaling factor, based on the relationship between the display state of the character image changed in display size and the display state of the surrounding area of the character image that has been changed in display size and is overlaid on the background image changed in display size.

Advantageous Effects of Invention

According to the present invention, an information processing device adjusts at least either a character image changed in display size with a second scaling factor or a background image changed in display size with a first scaling factor different from the second scaling factor, based on the relationship between the display state of the character image changed in display size and the display state of the surrounding area of the character image in the area where the character image changed in display size is overlaid on the background image changed in display size. The legibility of characters shown by the character image relates to the display state of the character image and the display state of the surrounding area of the character image. The information processing device makes the adjustment based on the relationship between these display states. This can improve the legibility of the characters shown by the character image part.

BRIEF DESCRIPTION OF DRAWINGS

FIG. 1 is a diagram schematically showing an example configuration of an information processing system S according to an embodiment.

FIG. 3A is a diagram showing example entries in a member DB 12*a*.

FIG. 3B is a diagram showing example entries in an item DB 12*b*.

FIG. 3C is a diagram showing example entries in an item image DB 12*c*.

FIG. 3D is a diagram showing example entries in the character image information.

FIG. 6 is a graph showing the relationship between the scaling factor of a background image and the scaling factor of a character image.

FIG. 9 is a flowchart showing an example of an image registration process in the system controller 14 of the online marketplace server 1 according to an embodiment.

FIG. 19 is a flowchart showing an example of the multiple scaled-down item images provision process in the system controller 14 of the online marketplace server 1 according to an embodiment.

FIG. 25 is a flowchart showing an example of a thickness adjustment process in the system controller 14 of the online marketplace server 1 according to an embodiment.

DESCRIPTION OF EMBODIMENTS

Figure 2B:
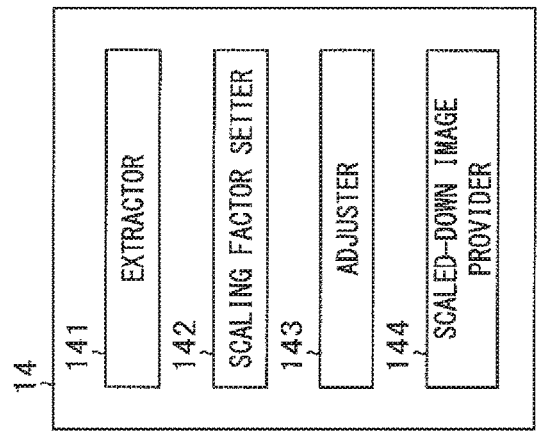
FIG. 2B is a diagram showing example functional blocks of a system controller 14 of the online marketplace server 1 according to an embodiment.

The following describes embodiments of the present invention in detail with reference to the drawings. In the embodiment described below, the present invention is applied to an information processing system for e-commerce in which an item image is scaled down. However, the present invention can be applied to not only e-commerce but also other systems. The present invention can be applied to any system or device that displays scaled down images. The present invention can also be applied not only to cases where an image is scaled down but also to, for example, cases an image is scaled up. The present invention can also be applied not only to an item image but also any image.

1. First Embodiment 1-1. Configuration and Functional Overview of Information Processing System First, a configuration and a functional overview of an information processing system S according to this embodiment will be described with reference to FIGS. 1 to 2B. FIG. 1 is a diagram schematically showing an example configuration of the information processing system S according to this embodiment.

As shown in FIG. 1, the information processing system S includes an online marketplace server 1, a plurality of store terminals 2, and a plurality of user terminals 3. The online marketplace server 1 is capable of exchanging data with each store terminal 2 and each user terminal 3 over a network NW using communication protocols, such as TCP/IP. The network NW includes, for example, the Internet, a dedicated communication line (e.g., community antenna television (CATV) line), a mobile communication network (including base stations), and a gateway.

The online marketplace server 1 is a server device that performs various processes for an online marketplace in which items can be purchased. The online marketplace server 1 is an example of an information processing device according to the present invention. Users who use the online marketplace can purchase any desired item from any desired store in the online marketplace. For example, the online marketplace server 1 sends web pages of the online marketplace and performs processes related to item searches, orders, and the like, in response to requests from the store terminals 2 and the user terminals 3.

Examples of web pages of the online marketplace include item pages and search results pages. Each item page is a web page that displays detailed information about a specific item. Examples of the detailed information include a trade name, item images, a price, and a description. Examples of the item images include an image showing an item and an image depicting a mental image of an item. The item images are registered, for example, by a store employee. The item page displays the item images, for example, with a display scaling factor of 100%. In some cases, an item image includes one or more character images. Each character image is an image indicating one or more characters. In the entire area of the item image, any area except the area occupied by the character image(s) is a background image. That is, a background image is an image in the background. For example, the store employee may create an item image by overlaying or drawing a character image on an image to be a background. Alternatively, for example, characters may be pre-captured in a photograph to be an item image.

The search results page displays the results of a search for items. The search results page displays a scaled-down view of an item image of each of one or more items found by the search. This scaled-down view is referred to as a scaled-down item image. The scaled-down item image is an item image scaled down with a display scaling factor of less than 100%. On some of the web pages of the online marketplace, a scaled-down item image of each of one or more item images may be displayed, for example, as a banner advertisement. Scaled-down item images may be displayed not only in the examples described here but also in various situations.

Each store terminal 2 is a terminal device used by, for example, an employee of a store in the online marketplace. The store terminal 2 accesses a server device such as the online marketplace server 1 in accordance with an operation performed, for example, by the employee. Thus, the store terminal 2 receives a web page from the server device and displays the web page. The store terminal 2 has software, such as a browser and an email client, installed on it. For example, the employee enters information about items for sale into the online marketplace and checks item order details using the store terminal 2.

Each user terminal 3 is a terminal device of a user who purchases items from the online marketplace. The user terminal 3 accesses the online marketplace server 1 in accordance with an operation performed by the user to receive a web page from the online marketplace server 1 and displays the web page. The user terminal 3 has software, such as a browser and an email client, installed on it. For example, a personal computer, a personal digital assistant (PDA), a mobile information terminal such as a smartphone, or a mobile phone is used as the user terminal 3. The user terminal 3 includes, for example, a controller, a storage unit, an input unit, a display unit, and a communication unit. The controller executes programs stored in the storage unit to control the entire operation of the user terminal 3. The controller may include, for example, a central processing unit (CPU), a read only memory (ROM), and a random access memory (RAM). The storage unit stores programs and data. For example, the storage unit may include hard disks and flash memories. The display unit is a display that displays characters and images. The input unit includes, for example, a keyboard, a mouse, buttons, and a touch screen.

1-2. Configuration of Online Marketplace Server

Next, a configuration of the online shopping mall server 1 will be described with reference to FIGS. 2A to 3D. FIG. 2A is a block diagram schematically showing an example configuration of the online marketplace server 1 according to this embodiment. As shown in FIG. 2A, the online marketplace server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with the store terminals 2, the user terminals 3, and the like.

The storage unit 12 includes, for example, hard disk drives. In this storage unit 12, a member DB 12, an item DB 12*b*, an item image DB 12*c*, and other databases has been created. "DB" is an abbreviation for database.

FIG. 3A is a diagram showing example entries in the member DB 12*a*. The member DB 12*a* stores member information about users who have signed up for the online marketplace. Specifically, the member DB 12*a* stores, for each user, the user's user ID, password, nickname, name, birth date, gender, zip code, address, telephone number, email address, credit card information, and other user attributes in association with each other.

FIG. 3B is a diagram showing example entries in the item DB 12*b*. The item DB 12*b* stores item information about items being sold in the online marketplace. The item information includes information entered by stores. Specifically, the item DB 12*b* stores, for each of the items that the stores sell, a store ID, the item's item ID, product code, trade name, and item description, and other information in association with each other. The store ID indicates a store that sells the item. The item ID is identification information of the item and used for the store to manage the item for sale. The product code is a code number identifying the item. When a plurality of stores sell the same items, each of the items is assigned the same product code. Examples of the product code include a Japanese article number (JAN) code.

FIG. 3C is a diagram showing example entries in the item image DB 12*c*. The item image DB 12*c* stores item images and information about the item images. Specifically, the item image DB 12*c* stores, for each of the items that the stores sell, the item's item ID, an image ID, an original item image, a background image, one or more pieces of character image information in association with each other. The item ID is identification information of the item image. The image ID may be for example, the file name of the item image or the URL of the item image. The original item image is an item image itself registered by a store. The background image is an item that is the background of the original item image. The character image information is information about a character image in the original item image. The character image information is stored for each character image.

FIG. 3D is a diagram showing example entries in the character image information. The character image information stores a character image, original coordinates, a level of importance, and a text. The original coordinates are coordinates indicating which position in the original item image the character image is displayed at. The original coordinates are, for example, coordinates in a coordinate system with the origin located at the top left corner of the original item image. The level of importance is information indicating the importance of displaying the character image when the item image is scaled down. For example, the level of importance of a character image that need not be displayed may be set to 0, and the level of importance of an important character image may be set to a value of 1 or greater. The text indicates one or more characters shown by the character image.

The following describes other information stored in the storage unit 12. The storage unit 12 stores various data, such as hypertext markup language (HTML) documents, extensible markup language (XML) documents, image data, text data, and electronic documents, for displaying web pages. The storage unit 12 also stores various set values.

The storage unit 12 also stores various programs, such as an operating system, a World Wide Web (WWW) server program, a database management system (DBMS), and a scaled-down image display control program. The scaled-down image display control program is a program for controlling display of a scaled-down view of an item image on a web page. The various programs may be available from, for example, another server device over the network NW. Alternatively, the various programs may be recorded in a recording medium, such as a magnetic tape, an optical disk, or a memory card, and be read via a drive device. The scaled-down image display control program and other programs may be program products.

The input/output interface 13 performs interface processing between the communication unit 11 and the storage unit 12, and the system controller 14.

The system controller 14 includes, for example, a CPU 14a, a ROM 14b, and a RAM 14c. The CPU 14a is an example processor. The present invention can also be applied to various processors that differ from CPUs. The storage unit 12, the ROM 14b, and the RAM 14c are each an example memory. The present invention can also be applied to various memories that differ from hard disks, ROMs, and RAMs.

The online marketplace server 1 may include a plurality of server devices. For example, a server device that processes orders for items in the online marketplace, a server device that sends a web page in response to a request from a store terminal 2 or a user terminal 3, a server device that adjusts at least either a resized character image or a scaled-down background image, a server device that sends a scaled-down item image in response to a request from a user terminal 3, a server device that manages databases, and other server devices may be connected to each other via a LAN or the like.

1-3. Functional Overview of System Controller

Figure 2A:
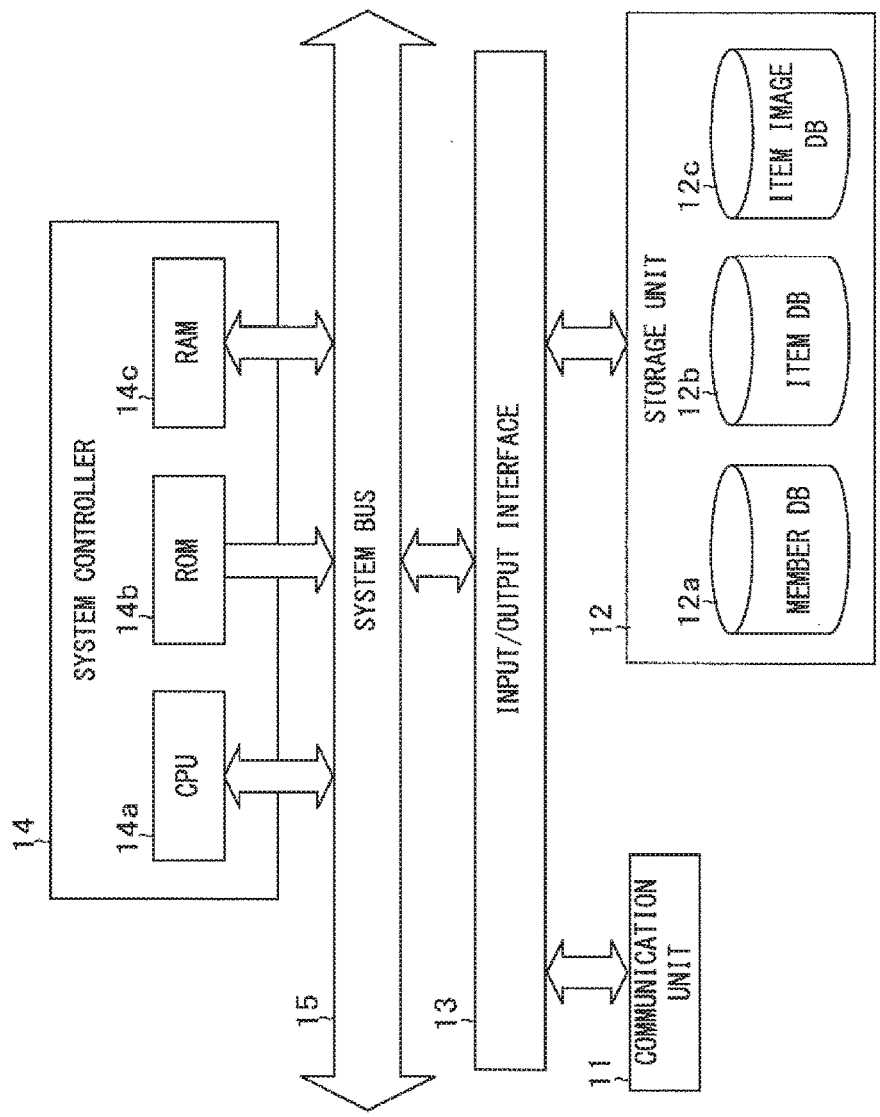
FIG. 2A is a block diagram schematically showing an example configuration of an online marketplace server 1 according to an embodiment.

The following describes a functional overview of the system controller 14 with reference to FIGS. 2B and 4A to 8B. FIG. 2B is a diagram showing example functional blocks of the system controller 14 of the online marketplace server 1 according to this embodiment. As shown in FIG. 2B, a scaled-down image display control program and other programs, which are read and executed by the CPU 14a, cause the system controller 14 to function as, for example, an extractor 141, a scaling factor setter 142, an adjuster 143, and a scaled-down image provider 144. The scaling factor setter 142 is an example of setting means of the present invention. The adjuster 143 is an example of adjusting means and second adjusting means of the present invention.

When causing a scaled-down item image of an item image to be displayed on the screen of a user terminal 3, the system controller 14 sets the scaling factor of a background image included in the item image to be different from the scaling factor of a character image included in the item image. The reason is to prevent reduction in the legibility of characters shown by the character image. Specifically, the system controller 14 scales down the background image with a certain scaling factor and also changes the display size of the character image with a scaling factor different from the scaling factor of the background image. A background image scaled down with a certain scaling factor is referred to as a scaled down background image. Change of the display size of the character image is to scale down or up the character image. A character image changed in display size with a certain scaling factor is referred to as a resized character image. The system controller 14 causes the user terminal 3 to display the scaled-down item image in which the resized character image is overlaid on the scaled-down background image.

The difference between the scaling factor of the background image and the scaling factor of the character image can deviate the positional relationship between the scaled-down background image and the resized character image from the positional relationship between the original background image and the original character image in the item image. This may reduce the legibility of characters shown by the resized character image. In some cases, for example, resized character images may overlap. In other cases, a background portion adjoining the resized character image in the scaled-down item image may differ from a background portion adjoining the character image before the item image is scaled down. This may reduce the difference in color between the resized character image and the background portion adjoining the resized character image. This difference in color is referred to as a color difference. The color difference may be, for example, a difference in brightness, a difference in color phase, a difference in chroma, or a combination of at least two of these differences. If the color difference is small make, it is difficult to distinguish the characters from the background.

Figure 4A:
FIG. 4A is a diagram showing an example of an item image M1 of a food item.

The following shows a specific example. FIG. 4A is a diagram showing an example of an item image M1 of a food item. The item image M1 includes a background image B1 and character images C1 to C5. The background image B1 is a photograph of an item. The character image C1 indicates the name of the item. The character image C2 indicates the weight of the item. The character image C3 indicates that the item is additive-free. The character image C4 indicates that the item will be shipped free. The character image C5 indicates the price of the item.

Figure 4B:
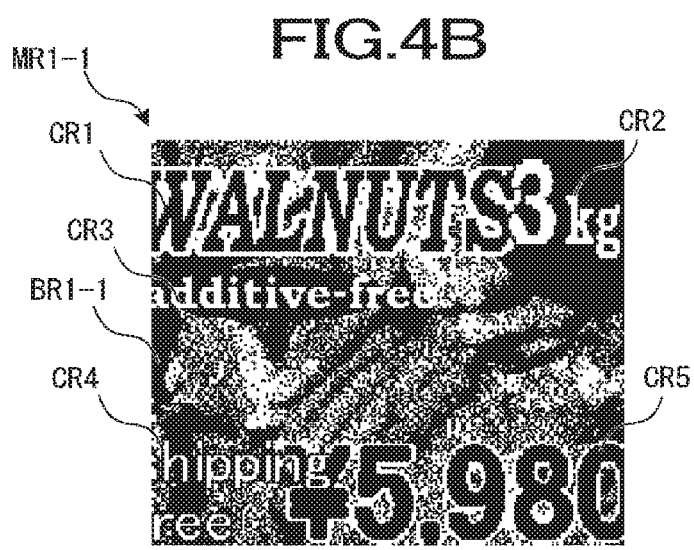
FIG. 4B is a diagram showing an example of displaying a scaled-down item image MR1-1, which is generated by scaling down the item image M1.

FIG. 4B is a diagram showing an example of displaying a scaled-down item image MR1-1, which is generated by scaling down the item image M1. The scaled-down item image MR1-1 includes a scaled-down background image BR1-1 and resized character images CR1 to CR5. The scaled-down background image BR1-1 is an image generated by scaling down the background image B1 with a scaling factor of 65%. The resized character images CR1 to CR5 are respectively images generated by scaling down the character images C1 to C5. In the example of FIG. 4B, each of the character images has been individually scaled down with a scaling factor of between 75% and 95%. In addition, the coordinates of each of the resized character images CR1 to CR5 have been set so that the positions of the resized character images relative to the scaled-down item image MR1-1 do not differ from the positions of the character images C1 to C5 relative to the item image M1. In this case, as shown in FIG. 4B, the resized character images CR1 and CR2 overlap, and the resized character images CR4 and CR5 are overlapping. Moreover, the resized character images CR1, CR3, CR4, and CR5 exceed the display area of the scaled-down item image MR1-1 and thus are partially missing.

To improve the legibility of the characters shown by the resized character image in the scaled-down item image, the system controller 14 adjusts at least either the resized character image or the scaled-down background image. Specific functions of the extractor 141, the scaling factor setter 142, the adjuster 143, and the scaled-down image provider 144 to do this will now be described.

Figure 5:
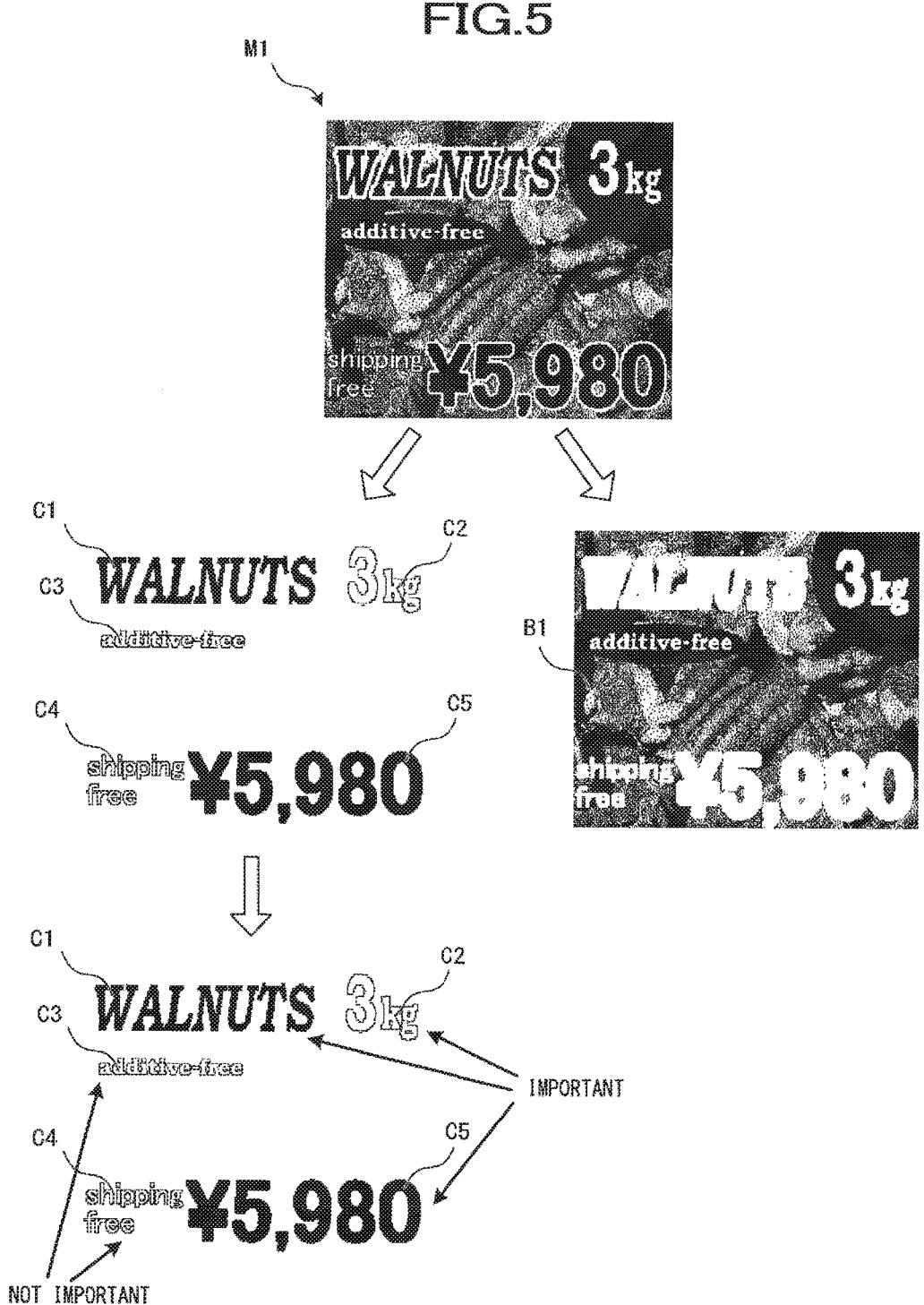
FIG. 5 is a diagram illustrating how character images and a background image are extracted from an original item image.

The extractor 141 extracts, for each of the original item images registered by the stores, character image(s) and a background image from the original item image. Extraction of the character image(s) and the background image is to separate or identify character portion(s) and the background from the original item image. The algorithm for extracting the character image(s) and the background image is not limited to a specific algorithm. The extractor 141 may use, for example, a known character extraction algorithm. FIG. 5 is a diagram illustrating how character images and a background image are extracted from an original item image. For example, when the item image M1 is specified as an original item image, the extractor 141 extracts the character images C1 to C5 and the background image B1.

After extracting the character image(s) and the background image, the extractor 141 may cause a store terminal 2 to display the result of the extraction to allow a store to perform an operation to specify a character image. A web page for an operation to specify a character image is referred to as a character image specification page. For example, the character image specification page displays the original item image and also displays, for each of extracted character images, a rectangle circumscribing the character image in the original item image. A store employee who operates the store terminal 2 may be allowed to combine a plurality of character images and to divide one character image into a plurality of character images. This enables extraction of character image(s) as the store intended.

The employee may be allowed to specify the level of importance of each character image. For example, the employee may be allowed to specify a character image that need not be displayed when the item image is scaled down, an important character image that should be displayed even when the item image is scaled down, and other character images. Also for example, the employee may be allowed to specify three or more types of levels of importance. Also for example, the employee may be allowed to specify the level of importance numerically. In the example shown in FIG. 5, the character images C1, C2, and C5 are specified as important character images, and the character images C3 and C4 are specified as character images that need not be displayed.

For example, the extractor 141 may automatically determine the level of importance. For example, when characters shown by a character image include a symbol or character indicating a currency unit, the extractor 141 may determine the level of importance of the character image to be higher than the other character images. Also for example, when characters shown by a character image include a preset type of character, the extractor 141 may determine the level of importance of the character image to be higher than the other character images. Also for example, the extractor 141 may determine, based on the size of characters shown by a character image, the level of importance of the character image. For example, the larger the size of the characters is, the higher the extractor 141 may determine the level of importance to be.

The extractor 141 identifies the coordinates of each character image finally determined. The coordinates indicate which position in the original item image the character image is displayed at. These coordinates are referred to as original coordinates. The original coordinates may be, for example, the coordinates of the center of a rectangle circumscribing the character image. Alternatively, the original coordinates may be, for example, the coordinates of a corner of the rectangle. In this embodiment, the coordinates of the center of the rectangle is used as the original coordinates.

The scaling factor setter 142 sets the scaling factor of the background image and the scaling factor of the character image. These scaling factors are used to scale down the original item image to generate or display a scaled-down item image. In the online marketplace, the size of an area in which the scaled-down item image is displayed may be predetermined, for example, based on what type of web page the scaled-down item image is displayed on or which place the scaled-down item image is displayed at. In this case, the scaling factor setter 142 sets the scaling factor of the background image so that the scaled-down background image fits in the area. Alternatively, the scaling factor setter 142 may freely determine the scaling factor of the background image.

For example, the scaling factor setter 142 need not set the scaling factor of the background image. For example, there may be a case where a scaling factor is preset for a web page on which the scaled-down item image is to be displayed or a case where a scaling factor is set by a user. In this case, the scaling factor setter 142 only needs to obtain the preset scaling factor or the scaling factor set by the user as the scaling factor of the background image.

The scaling factor setter 142 may determine a minimum character size, for example, before setting the scaling factor of the character image. The minimum character size may be, for example, common to all the users or all the user terminals 3. For example, the minimum character size may be preset.

Also for example, the scaling factor setter 142 may determine a minimum character size for each user or each user terminal 3. For example, the scaling factor setter 142 may determine a minimum character size, based on the legibility of characters. For example, JIS S 0032-2003 ("Guidelines for the elderly and people with disabilities—Visual signs and displays—Estimation of minimum legible size for a Japanese single character") discloses a method for estimating a minimum legible character size. The extractor 141 may determine a minimum legible character size estimated based on this estimation method to be the minimum character size. This method estimates a minimum legible character size, for example, based on the age of a target who reads characters, the target's viewing distance, and the luminance of background. For example, the age, the viewing distance, and the luminance may be preset. Also for example, the scaling factor setter 142 may determine at least one of the age, the viewing distance, and the luminance, depending on the situation. For example, the scaling factor setter 142 can retrieve the age of the target from the member DB 12*a*. Also for example, in some cases, the scaling factor setter 142 can identify what type of user terminal 3 the target uses from user agent information included in a request sent from the user terminal 3 to the online marketplace server 1. The scaling factor setter 142 may determine the viewing distance, for example, based on the type of the user terminal 3. For example, the scaling factor setter 142 may make the viewing distance for a mobile phone, a smartphone, a PDA, or the like longer than the viewing distance for a stationary device such as a personal computer. The scaling factor setter 142 may determine a minimum character size, for example, for each character type.

After determining a minimum character size, the scaling factor setter 142 sets the scaling factor of the character image so that the size of characters shown by the resized character image do not fall below the minimum character size. FIG. 6 is a graph showing the relationship between the scaling factor of a background image and the scaling factor of a character image. For example, assume that the scaling factor of a character image is 60% when the size of characters shown by the character image is equal to the minimum character size. In this case, for example, as shown in the graph G1 of FIG. 6, the scaling factor setter 142 may make the scaling factor of the character image equal to the scaling factor of the background image as far as the scaling factor is between 100% and 60%. For any scaling factor between 100% and 60%, the scaling factor of the character image may be equal to the scaling factor of the background image for such a scaling factor because characters are clear enough to read. Consequently, the positional relationship between the character image and the background image remains unchanged. When the scaling factor of the background image is between 60% and 0%, the scaling factor setter 142 sets the scaling factor of the character image to 60%. That is, the scaling factor setter 142 sets the scaling factor of the character image to a scaling factor different from the scaling factor of the background image. Also when the scaling factor of the background image is greater than or equal to 60%, the scaling factor setter 142 may set the scaling factor of the character image to a scaling factor larger than the scaling factor of the background image. For example, the scaling factor setter 142 may set the scaling factor of the character image in a manner shown in the graph G2 of FIG. 6. Assume that the relationship between x and y, which is shown in the graph G2, is expressed as y=ax+b, where x is the scaling factor of the background image, y is the scaling factor of the character image, and y is greater than or equal to 60% but less than or equal to 100%. In this case, a is set to satisfy the following relationship: a<1 and b=1−a. Alternatively, for example, the scaling factor setter 142 may set the scaling factor of the character image in a manner shown in the graph G3 of FIG. 6. In this case, as the scaling factor of the character image approaches 60% from 100%, the rate of decrease in the scaling factor of the character image rises.

There may be a case where the size of characters shown by a character image extracted from the original item image is already less than the minimum character size. In this case, the scaling factor setter 142 may keep the scaling factor of the character image 100%. Alternatively, the scaling factor setter 142 may set the scaling factor of the character image to a scaling factor that makes the size of the characters greater than or equal to the minimum character size. That is, the scaling factor of the character image is set to a value greater than 100%. Thus, the character image is scaled up. This can enhance the legibility of characters.

After setting a scaling factor, the scaling factor setter 142 determines the coordinates of a default display position of the character image changed in display size with the set scaling factor (the resized character image), in the background image scaled down with the set scaling factor (the scaled-down background image). The default display position is referred to as a reference position, and the coordinates of the reference position is referred to as reference coordinates. The reference coordinates are, for example, coordinates in a coordinate system with the origin located at the top left corner of the scaled-down background image. For example, the scaling factor setter 142 determines the reference coordinates so that the positional relationship between the scaled-down background image and the resized character image is similar to the positional relationship between the original background image and the original character image. Specifically, the scaling factor setter 142 may multiply the original coordinates of the character image by the scaling factor of the background image to calculate the reference coordinates. Determination of the reference coordinates is made when the background image is scaled down, which differs from adjustment of the position of the resized character image by the adjuster 143.

The adjuster 143 adjusts at least either the character image changed in display size with the scaling factor set by the scaling factor setter 142 (the resized character image) or the background image scaled down with the scaling factor set by the scaling factor setter 142 (the scaled-down background image). The adjuster 143 makes the adjustment, based on the display state of the resized character image and on the display state of the surrounding area of the resized character image that is overlaid on the scaled-down background image. Consequently, the adjuster 143 improves the legibility of the characters shown by the resized character image, in the scaled-down item image in which the resized character image is overlaid on the scaled-down background image. What and how to adjust can vary.

In this embodiment, as an example of adjusting a resized character image, the adjuster 143 adjusts the display position of the resized character image. The coordinates of the display position is referred to as display coordinates. Specifically, the adjuster 143 changes the display coordinates of the resized character image from the reference coordinates determined by the scaling factor setter 142 to make the adjustment. The display state of the resized character image in this case is the display position of a resized character image of interest among a plurality of resized character images. The display state of the surrounding area of the resized character image in this case is the display position of resized character image(s) except the resized character image of interest, among the plurality of resized character images. The relationship between these display states is the positional relationship between the resized character image of interest and the other resized character image(s).

For example, when there are a plurality of resized character images, the adjuster 143 adjusts the display position of at least one of the resized character images so that the plurality of resized character images are positioned not to overlap. If the display positions of the resized character images remain unchanged from their reference positions, some of the resized character images may overlap, for example, as shown in FIG. 4B. The adjuster 143 prevents such a situation from occurring.

Figure 7A:
FIG. 7A is a diagram showing the positional relationship between two character images in an original item image.

Policies for adjusting the display position(s) of resized character image(s) is as follows:
(1) avoid overlap between resized character images
(2) remove a resized character image of less importance and utilize the area for the removed resized character image
(3) try to keep the display position of a resized character image as close to its reference position as possible
(4) prevent the positional relationship (i.e., the distance and the angle) among resized character images from changing The following shows a specific example. FIG. 7A is a diagram showing the positional relationship between two character images in an original item image. As shown in FIG. 7A, in the original item image, character images CE1 and CE2 are displayed with a predetermined space between them.

Figure 7B:
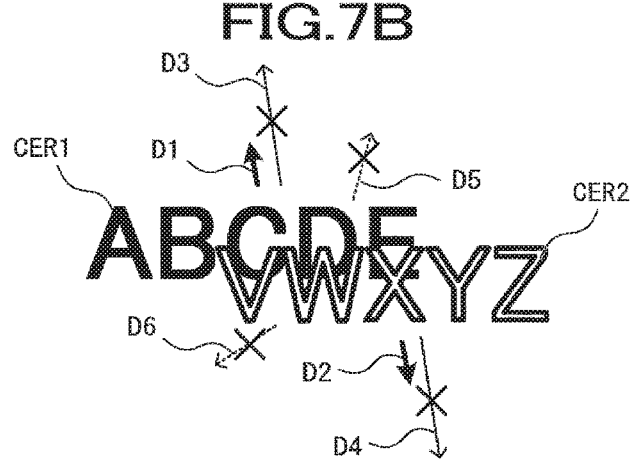
FIG. 7B is a diagram showing an example of adjusting the display positions of resized character images in a scaled-down item image.
Figure 7C:
FIG. 7C is a diagram showing the positional relationship between the resized character images whose display positions have been adjusted.

FIG. 7B is a diagram showing an example of adjusting the display positions of resized character images in a scaled-down item image. In FIG. 7B, resized character images CER1 and CER2 are respectively images generated by scaling down the character images CE1 and CE2. The default display positions of the resized character images CER1 and CER2 are reference positions determined by performing a similarity transformation on the original coordinates of the character images CE1 and CE2 when the corresponding background image is scaled down. Thus, the resized character images CER1 and CER2 overlap. For example, the adjuster 143 changes the display position of at least one of the resized character images CER1 and CER2 at a distance required to avoid overlap between the resized character images CER1 and CER2. When changing the display position, the adjuster 143 tries to keep the positional relationship between the resized character images CER1 and CER2 as much as possible. For example, the adjuster 143 changes the display position of the resized character image CER1 by the distance indicated by the arrow D1 in the direction indicated by the arrow D1, and also changes the display position of the resized character image CER2 by the distance indicated by the arrow D2 in the direction indicated by the arrow D2. The adjuster 143 does not change the display positions of the resized character images CER1 and CER2 by the longer than the required distances as indicated by the arrows D3 and D4. The adjuster 143 also does not change the display positions so as to cause an unnecessarily large change in the direction of the resized character image CER2 when viewed from the resized character image CER1 as indicated by the arrows D5 and D6. FIG. 7C is a diagram showing the positional relationship between these resized character images formed after the display position of the resized character image CER1 is changed by the distance indicated by the arrow D1 in the direction indicated by the arrow D1, and the display position of the resized character image CER2 is changed by the distance indicated by the arrow D2 in the direction indicated by the arrow D2.

Figure 7D:
FIG. 7D is a diagram showing another example of adjusting the display positions of resized character images in a scaled-down item image.

FIG. 7D is a diagram showing another example of adjusting the display positions of resized character images in a scaled-down item image. In FIG. 7D, the resized character images CER1 and CER2 overlap. A resized character image CER3 is positioned below the resized character image CER2. Thus, if the adjuster 143 changes the display position of the resized character image CER2 so as to avoid overlap between the resized character images CER1 and CER2, the resized character images CER2 and CER3 will overlap. However, for example, assume that the resized character image CER3 is specified as a character image that need not be displayed. In this case, the resized character image CER3 is removed. The adjuster 143 can change the display position of the resized character image CER2 to the area in which the resized character image CER3 was positioned.

The adjuster 143 may always remove a character image that need not be displayed or may, if required, remove a character image that need not be displayed. For example, when the adjustment of the display positions of a plurality of resized character images fails to eliminate overlap between some of the resized character images, the adjuster 143 may remove a character image that need not be displayed. Subsequently, the adjuster 143 may adjust the display positions of the remaining resized character images again. Also for example, in a situation where three or more types of levels of importance can be set for character images, the adjuster 143 may remove a resized character image in ascending order of importance each time the adjustment of the display positions of the resized character images fails to eliminate overlap between some of the resized character images. Until the overlap between the resized character images is eliminated, the adjuster 143 may repeatedly adjust the display positions of the resized character images and remove a resized character image of less importance. The adjuster 143 may or may not remove some of the resized character images, based on the levels of importance.

The adjuster 143 may or may not follow some or all of the above policies (2) to (4) as long as overlap between the resized character images is avoided.

The algorithm for adjusting the display positions of a plurality of resized character images is not limited to a specific algorithm. For example, the adjuster 143 may use an algorithm based on a force-directed drawing model (spring model). In this case, points corresponding to the display positions of adjacent resized character images are connected at the edges. Additionally, a point corresponding to the display position of each resized character image and a point corresponding to its reference position are connected at the edges. These edges are regarded as springs. The adjuster 143 repeatedly calculates the coordinates of the display position of each resized character image, based on the force-directed drawing model, and determines which display positions prevent overlap between the adjacent resized character images. Alternatively, for example, the adjuster 143 may use an algorithm based on the least-squares method. For example, an energy function is defined. The energy function indicates an ideal positional relationship between a plurality of resized character images. The adjuster 143 sets, for each pair of adjacent resized character images, relative positions to be an ideal positional relationship that prevents overlap between the resized character images. The adjuster 143 determines an energy function that indicates the sum total of squares, each of which is the square of the difference between the relative positions between two resized character images and their ideal relative positions, and also indicates the sum total of squares, each of which is the square of the difference between the display position of each resized character image and its reference position. The adjuster 143 minimizes this energy function using the least-squares method to determine the display position of each resized character image. Also for example, the adjuster 143 may detect overlapping resized character images and then change the display positions of all or some of the detected resized character images so as to eliminate the overlap between the detected resized character images. The adjuster 143 may repeat such a process until the overlap between all the resized character images is eliminated. As long as the overlap between the resized character images is eliminated, the adjuster 143 only needs to adjust the display position of at least one of the resized character images.

Figure 8A:
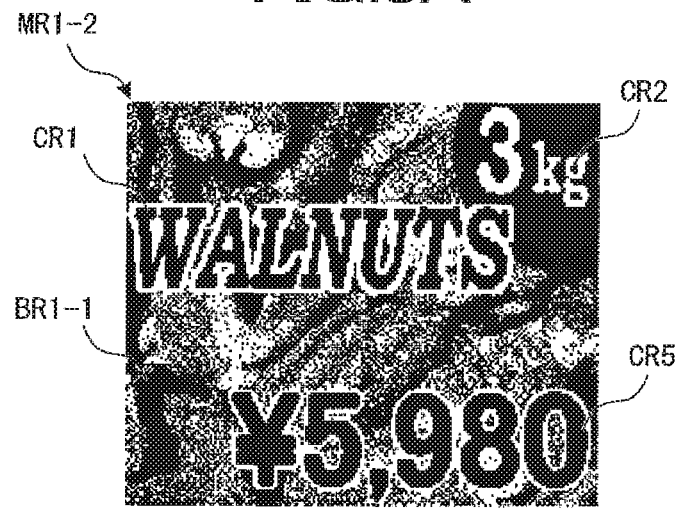
FIG. 8A is a diagram showing an example of displaying a scaled-down item image MR1-2 in which the display positions of resized character images have been adjusted.

FIG. 8A is a diagram showing an example of displaying a scaled-down item image MR1-2 in which the display positions of resized character images have been adjusted. The scaled-down item image MR1-2 is a scaled-down item image corresponding to the item image M1. In the scaled-down item image MR1-2, for example, the resized character images CR3 and CR4, which need not be displayed, have been removed. Additionally, the display positions of the resized character images CR1 and CR2 have been adjusted so that these resized character images are positioned not to overlap. Consequently, the legibility of the character images CR1 and CR2 is improved compared to the scaled-down item image MR1-1 shown in FIG. 4B.

The adjuster 143 may adjust the display position of at least one resized character image so that the resized character image is positioned to extend out from the corresponding scaled-down background image. This widens the area that can be used to adjust the display position, thus improving the legibility of characters. For example, this makes it easier to avoid overlap between resized character images. Also for example, this makes it easier to keep the positional relationship between resized character images. Even when a resized character image extends out from the scaled-down background image, the adjuster 143 desirably adjusts the display position of the resized character image so that at least part of the resized character image is positioned within the area for the scaled-down background image. For example, the adjuster 143 can achieve this by repeatedly adjusting the display position of the resized character image until at least part of the resized character image is positioned within the area for the scaled-down background image. However, the entirety of the resized character image may be positioned outside the area for the scaled-down background image.

The area in which resized character images can be displayed is referred to as a character displayable area. When the resized character image is allowed to extend out from the scaled-down background image, the character displayable area is, for example, an area surrounding the area for the scaled-down background image. When the resized character image is forbidden to extend out from the scaled-down background image, the character displayable area coincides with the area for the scaled-down background image. The shape and the size of the character displayable area may be predetermined, for example, based on what type of web page the scaled-down item image is displayed on or which place the scaled-down item image is displayed at. Usually, the size of the character displayable area is smaller than the display size of the original item image. However, the size of the character displayable area may not be smaller than the display size of the original item image. The adjuster 143 adjusts the display position of a resized character image so that the resized character image does not extend out from the character displayable area. For example, until all the resized character images are positioned within the character displayable area, the adjuster 143 may repeatedly adjust the display positions of the resized character images.

Figure 8B:
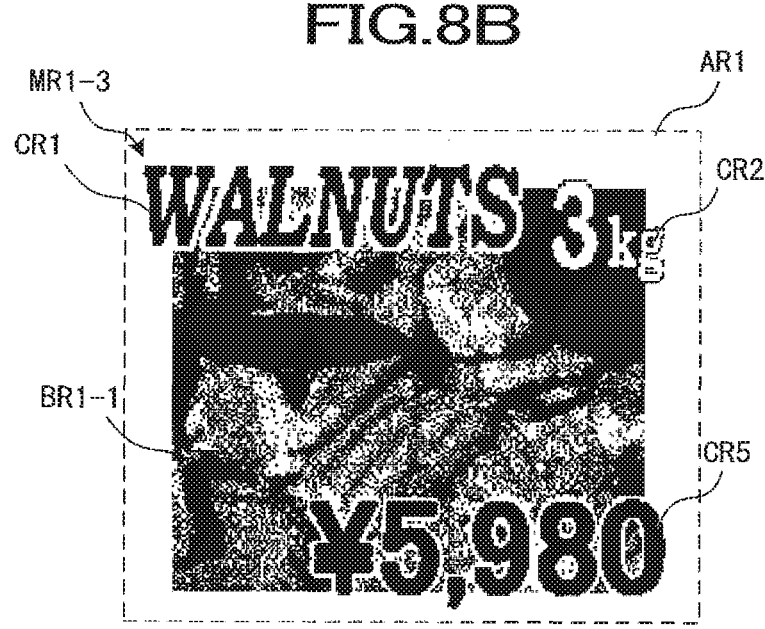
FIG. 8B is a diagram showing an example of displaying a scaled-down item image MR1-3 in which the resized character images extends out from the background image.

FIG. 8B is a diagram showing an example of displaying a scaled-down item image MR1-3 in which the resized character images extends out from the background image. The scaled-down item image MR1-3 is a scaled-down item image corresponding to the item image M1. In the scaled-down item image MR1-3, each of the resized character images CR1, CR2, and CR5 is displayed partially extending out from the scaled-down background image BR1-1. In FIG. 8B, the sign AR1 indicates the character displayable area.

For a purpose different from the purpose of eliminating overlap between resized character images, the adjuster 143 may adjust the display positions of some or all of the resized character images. For example, the adjuster 143 may adjust the display position of a resized character image so that the resized character image whose display position has been adjusted covers as large a part as possible of the area in which the resized character image at its reference position is positioned. In the scaled-down item image, the area in which a resized character image was previously positioned need to be supplemented with the background. However, the supplement with the background does not necessarily reproduce the original background. If the resized character image whose display position has been adjusted covers a larger part of the area in which the resized character image was previously positioned, most of the supplemented portion can be hidden. The background may be supplemented after the display position of the resized character image is adjusted. In this case, the portion hidden by the resized character image need not be supplemented. Thus, the area to be supplemented becomes smaller. Consequently, the processing load on the system controller 14 can be reduced.

Alternatively, for example, the adjuster 143 may adjust the display position of a resized character image so that the difference between the color of the edge of the resized character image whose display position has been adjusted and the color of the surrounding background of the resized character image becomes as large as possible or does not become small as much as possible. This can improve the legibility of characters.

The scaled-down image provider 144 provides a scaled-down item image to the user terminal 3. For example, the scaled-down image provider 144 may overlay each resized character image on the scaled-down background image to generate a scaled-down item image. The scaled-down image provider 144 may then send the generated scaled-down item image to the user terminal 3. Alternatively, for example, the scaled-down image provider 144 may send each resized character image and display coordinates indicating the adjusted display positions to the user terminal 3, and also send the scaled-down background image to the user terminal 3. The scaled-down image provider 144 may then cause the user terminal 3 to display the scaled-down item image, based on the resized character images, the display coordinates, and the scaled-down background image. For example, the user terminal 3 may overlay the resized character images on the scaled-down background image to generate a scaled-down item image. Alternatively, for example, the user terminal 3 may display the scaled-down background image, and also display the resized character images at the positions indicated by the display coordinates on the scaled-down background image. Also for example, a server including the scaled-down image provider 144 may differ from a server including the extractor 141, the scaling factor setter 142, and the adjuster 143. In this case, the server including the extractor 141, the scaling factor setter 142, and the adjuster 143 is an example of the information processing device according to the present invention.

1-4. How Information Processing System Works

The following describes how the information processing system S works, with reference to FIGS. 9 to 12. FIG. 9 is a flowchart showing an example of an image registration process in the system controller 14 of the online marketplace server 1 according to this embodiment. The image registration process is a process for storing an item image sent from a store in the item image DB 12*c* and for extracting character images and a background image from the item image.

A store employee operates a store terminal 2 to request registration of an item image stored in the store terminal 2. The store terminal 2 then sends the specified item image and the corresponding item ID to the online marketplace server 1. When the online marketplace server 1 receives the item image from the store terminal 2, the system controller 14 performs the image registration process.

As shown in FIG. 9, the extractor 141 stores the received item image as an original item image in association with the item ID in the item image DB 12*c* (Step S11). Subsequently, the extractor 141 extracts character images and a background image from the original item image (Step S12). The extractor 141 then supplements the area from which the character images have been extracted in the background image, based on an image surrounding the area (Step S13). The algorithm for supplementing the background is not limited to a specific algorithm. When a resized character image is generated or displayed, the background may be supplemented after the display positions of resized character images are adjusted. In this case, it is possible to make the area to be supplemented smaller. Next, the extractor 141 stores the supplemented background image in association with the item ID in the item image DB 12*c* (Step S14).

After that, the extractor 141 sends a character image specification page to the store terminal 2, based on the original item image and the result of the extraction of the character images (Step S15). On the character image specification page, for example, the employee combines or divides the character images, and specifies levels of importance. Subsequently, the extractor 141 combines or divides the character images, and identifies the level of importance of each character image, based on information sent from the store terminal 2 to the online marketplace server 1. The extractor 141 then calculates the original coordinates of each character image in the original item image (Step S16). Next, the extractor 141 generates texts shown by the character images, based on the result of the extraction of the character images. For example, the extractor 141 may recognize characters using a known character recognition algorithm. The extractor 141 then stores, for each character image, the character image, the original coordinates thereof, the level of importance thereof, and the corresponding text in association with the item ID in the item image DB 12*c* (Step S17). After that, the extractor 141 terminates the image registration process.

Figure 10:
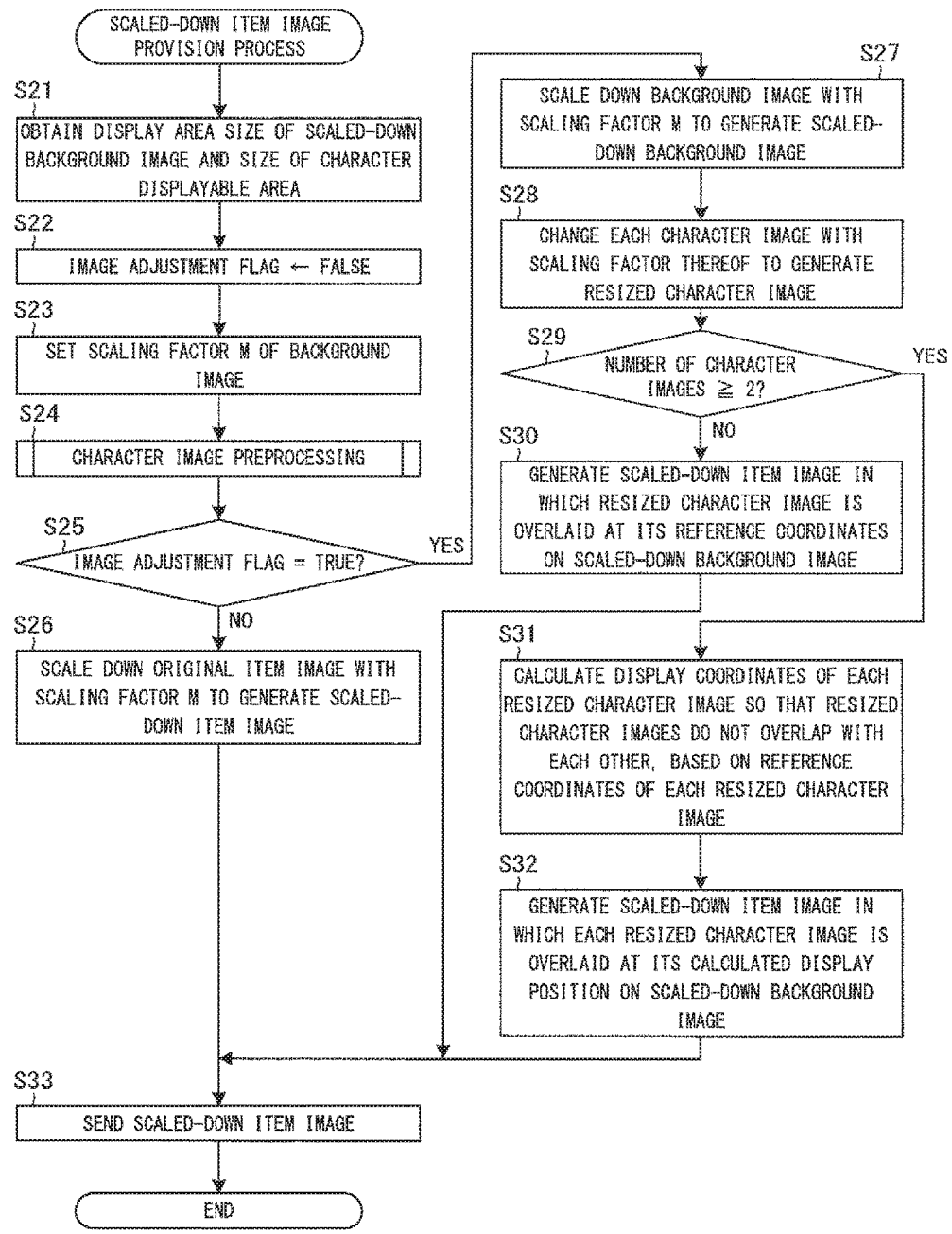
FIG. 10 is a flowchart showing an example of a scaled-down item image provision process in the system controller 14 of the online marketplace server 1 according to an embodiment.

FIG. 10 is a flowchart showing an example of a scaled-down item image provision process in the system controller 14 of the online marketplace server 1 according to this embodiment. The scaled-down item image provision process is a process for providing a scaled-down item image to a user terminal 3 that displays a web page containing the scaled-down item image. The user terminal 3 displays the web page, for example, based on an HTML document sent from the online marketplace server 1. From the HTML document, the user terminal 3 obtains the URL of the scaled-down item image to be displayed on the web page. This URL may include, for example, the image ID of an item image to be scaled down, the display area size of a scaled-down background image, and the size of a character displayable area. The user terminal 3 sends a scaled-down item image request including the obtained URL to the online marketplace server 1. When the online marketplace server 1 receives the scaled-down item image request from the user terminal 3, the system controller 14 performs the scaled-down item image provision process.

As shown in FIG. 10, the scaled-down image provider 144 obtains the image ID, the display area size of the scaled-down background image, and the size of the character displayable area from the received scaled-down item image request (Step S21). Subsequently, the adjuster 143 sets an image adjustment flag to FALSE (Step S22). The image adjustment flag is a flag that indicates whether to adjust at least either a resized character image or a scaled-down background image. In this embodiment, when the scaling factor of at least one character image is set to a scaling factor different from the scaling factor of the background image, the system controller 14 sets the image adjustment flag to TRUE. However, the system controller 14 may set the image adjustment flag to TRUE, for example, only when resized character images that overlap are detected.

Subsequently, the scaling factor setter 142 sets the scaling factor M of the background image (Step S23). Specifically, the scaling factor setter 142 retrieves the background image corresponding to the image ID included in the URL from the item image DB 12*c*. Next, the scaling factor setter 142 obtains the size of the background image from the background image. Based on the display area size of the scaled-down background image and the size of the background image, the scaling factor setter 142 calculates the scaling factor M so that the display area of the scaled-down background image circumscribes the scaled-down background image. After that, the scaling factor setter 142 performs character image preprocessing (Step S24).

Figure 11:
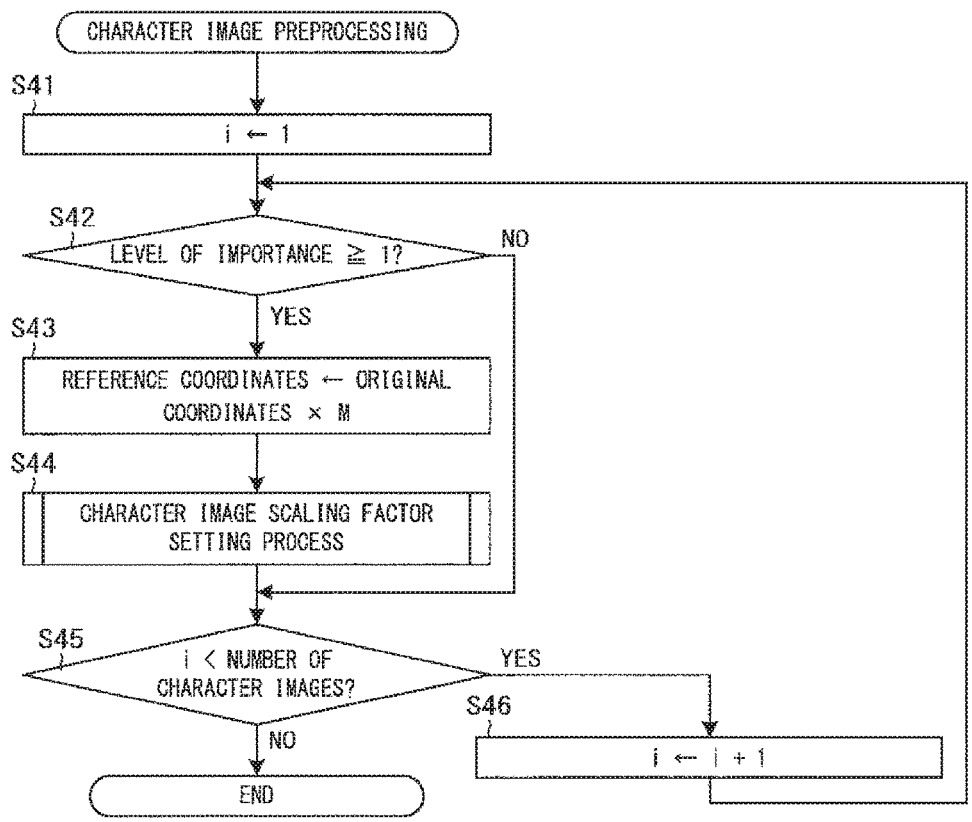
FIG. 11 is a flowchart showing an example of character image preprocessing in the system controller 14 of the online marketplace server 1 according to an embodiment.

FIG. 11 is a flowchart showing an example of the character image preprocessing in the system controller 14 of the online marketplace server 1 according to this embodiment. As shown in FIG. 11, the scaling factor setter 142 sets a variable i to 1 (Step S41). Subsequently, the scaling factor setter 142 retrieves the i-th character image information, among one or more pieces of character image information stored in association with the image ID in the item image DB 12*c*. A character image included in the i-th character image information is referred to as a character image (i). Next, the scaling factor setter 142 determines whether the level of importance included in the i-th character image information is greater than or equal to one (Step S42). If the scaling factor setter 142 determines that the level of importance is not greater than or equal to one (NO in Step S42), the character image preprocessing proceeds to Step S45. On the other hand, if the scaling factor setter 142 determines that the level of importance is greater than or equal to one (YES in Step S42), the character image preprocessing proceeds to Step S43. In Step S43, the scaling factor setter 142 multiplies the original coordinates included in the i-th character image information by the scaling factor M to calculate the reference coordinates of the character image (i). After that, the scaling factor setter 142 performs a character image scaling factor setting process (Step S44).

Figure 12:
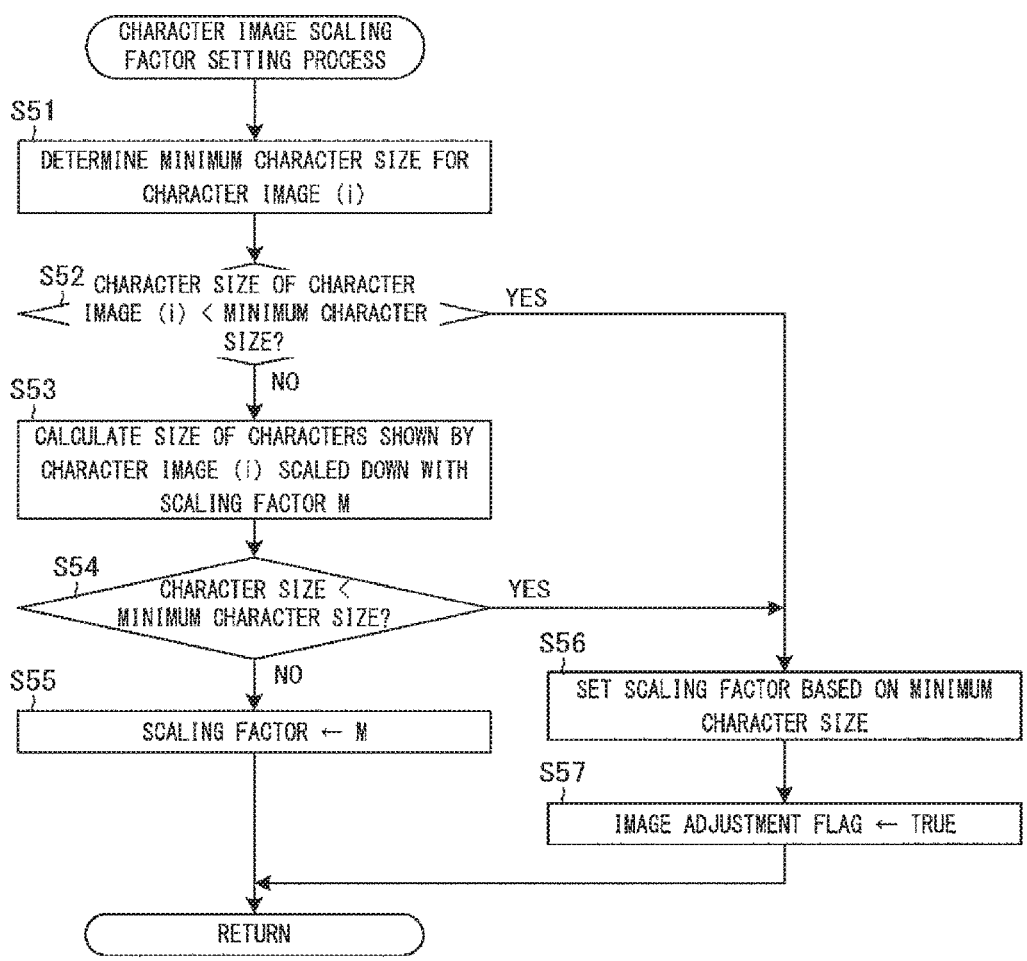
FIG. 12 is a flowchart showing an example of a character image scaling factor setting process in the system controller 14 of the online marketplace server 1 according to an embodiment.

FIG. 12 is a flowchart showing an example of the character image scaling factor setting process in the system controller 14 of the online marketplace server 1 according to this embodiment. As shown in FIG. 12, the scaling factor setter 142 determines a minimum character size for the character image (i) (Step S51). For example, the scaling factor setter 142 may retrieve a predetermined minimum character size from the storage unit 12. Alternatively, for example, the scaling factor setter 142 may determine the minimum character size, depending on the user terminal 3 that has sent the scaled-down item image request or the user of the user terminal 3. How to determine the minimum character size in this case has already been described.

Subsequently, the scaling factor setter 142 determines whether the character size of the character image (i) is less than the minimum character size (Step S52). Before this determination, the scaling factor setter 142 identifies the size of characters shown by the character image (i). For example, the scaling factor setter 142 identifies the number of pixels of the characters indicated by the character image (i). The scaling factor setter 142 then converts the character size expressed in pixels into a character size expressed in points. The scaling factor setter 142 may identify the pixel density of the screen of the user terminal 3, for example, based on user agent information received from the user terminal 3, and then make the conversion, based on the pixel density. If the scaling factor setter 142 determines that the character size of the character image (i) is not less than the minimum character size (NO in Step S52), the character image scaling factor setting process proceeds to Step S53. On the other hand, if the scaling factor setter 142 determines that the character size of the character image (i) is less than the minimum character size (YES in Step S52), the character image scaling factor setting process proceeds to Step S56.

In Step S53, when the character image (i) is scaled down with the scaling factor M, the scaling factor setter 142 calculates the size of the characters shown by the scaled down character image (i). The scaling factor setter 142 then determines whether the calculated character size is less than the minimum character size (Step S54). If the scaling factor setter 142 determines that the character size is not less than the minimum character size (NO in Step S54), the character image scaling factor setting process proceeds to Step S55. On the other hand, if the scaling factor setter 142 determines that the character size is less than the minimum character size (YES in Step S54), the character image scaling factor setting process proceeds to Step S56.

In Step S55, the scaling factor setter 142 sets the scaling factor of the character image (i) to the scaling factor M. The scaling factor setter 142 then terminates the character image scaling factor setting process.

In Step S56, the scaling factor setter 142 sets the scaling factor of the character image (i) to a scaling factor based on the minimum character size. Specifically, the scaling factor setter 142 divides the minimum character size by the size of the characters shown by the character image (i) to calculate the scaling factor of the character image (i). Subsequently, the scaling factor setter 142 sets the image adjustment flag to TRUE (Step S57). The scaling factor setter 142 then terminates the character image scaling factor setting process.

When the character image scaling factor setting process ends, the scaling factor setter 142 determines whether the variable i is less than the number of the character images stored in association with the image ID in the item image DB 12c, as shown in FIG. 11 (Step S45). If the scaling factor setter 142 determines that the variable i is less than the number of the character images (YES in Step S45), the character image preprocessing proceeds to Step S46. In Step S46, the scaling factor setter 142 adds 1 to the variable i, and the character image preprocessing proceeds to Step S42. On the other hand, if the scaling factor setter 142 determines that the variable i is not less than the number of the character images (NO in Step S45), it terminates the character image preprocessing.

When the character image preprocessing ends, the adjuster 143 determines whether the image adjustment flag is TRUE (Step S25). If the adjuster 143 determines that the image adjustment flag is not TRUE (NO in Step S25), the scaled-down item image provision process proceeds to Step S26. On the other hand, if the adjuster 143 determines that the image adjustment flag is TRUE (YES in Step S25), the scaled-down item image provision process proceeds to Step S27.

In Step S26, the scaled-down image provider 144 retrieves the original item image corresponding to the image ID from the item image DB 12c. Subsequently, the scaled-down image provider 144 scales down the original item image with the scaling factor M to generate a scaled-down item image. The scaled-down image provider 144 causes the scaled-down item image provision process to proceed to Step S33.

In Step S27, the scaled-down image provider 144 scales down the background image with the scaling factor M to generate a scaled-down background image. Subsequently, the scaled-down image provider 144 identifies one or more character images whose scaling factors have been set in the character image scaling factor setting process, among one or more character images corresponding to the image ID. The scaled-down image provider 144 then scales down or up each of the identified one or more character images with the scaling factor of the character image to generate a resized character image (Step S28). Next, the adjuster 143 determines whether the number of character images whose scaling factors have been set is greater than or equal to two (Step S29). If the adjuster 143 determines that the number of character images whose scaling factors have been set is not greater than or equal to two (NO in Step S29), the scaled-down item image provision process proceeds to Step S30. On the other hand, if the adjuster 143 determines that the number of character images whose scaling factors have been set is greater than or equal to two (YES in Step S29), the scaled-down item image provision process proceeds to Step S31.

In Step S30, the scaled-down image provider 144 overlays the resized character image at its reference coordinates on the scaled-down background image to generate a scaled-down item image. For example, the adjuster 143 may adjust the display position of the resized character image so that the resized character image is positioned within the character displayable area. The scaled-down image provider 144 may then overlay the resized character image at the adjusted display position on the scaled-down background image. Next, the scaled-down image provider 144 causes the scaled-down item image provision process to proceed to Step S33.

In Step S31, the scaled-down image provider 144 adjusts the display position of at least one of a plurality of resized character images so that these resized character images do not overlap with each other, for example, based on the reference coordinates of each resized character image and on the size of the character displayable area. How to adjust the display position has already been described. Subsequently, the scaled-down image provider 144 overlays each resized character image at its adjusted display position on the scaled-down background image to generate a scaled-down item image (Step S32). Next, scaled-down image provider 144 causes the scaled-down item image provision process to proceed to Step S33.

In Step S33, the scaled-down image provider 144 sends the scaled-down item image generated in Step S26, S30, or S32 to the user terminal 3. The scaled-down image provider 144 then terminates the scaled-down item image provision process.

The system controller 14 may set the scaling factor of character images and the scaling factor of a background image and also adjust resized character images and a scaled-down background image in advance. For example, when storing an item image in the item image DB 12c, the system controller 14 may generate all necessary scaled-down item images of different sizes and also store the scaled-down item images in the item image DB 12c. For each necessary scaled-down item image, the system controller 14 sets the scaling factor of the image and adjusts the image. When a scaled-down item image request is received from a store terminal 3, the system controller 14 sends a scaled-down item image stored in the item image DB 12c.

As described above, according to this embodiment, the system controller 14 sets the scaling factor of a background image extracted from an original item image and the scaling factor of a character image extracted from the original item image so that the scaling factors are different from each other. The system controller 14 adjusts at least either a resized character image or a scaled-down background image. The resized character image is the character image changed in display size with the set scaling factor. The scaled-down background image is the background image scaled down with the set scaling factor. The system controller 14 makes this adjustment, based on the relationship between the display state of the resized character image and the display state of the surrounding area of the resized character image that is overlaid on the scaled-down background image. This can improve the legibility of characters shown by a character image part.

When a plurality of resized character images are extracted from the original item image, the system controller 14 may adjust the display position of at least one of the plurality of resized character images so that these resized character images are positioned not to overlap. This makes the legibility of each character image higher than when the character images overlap.

When the size of characters shown by the extracted character image is less than a minimum character size, the system controller 14 may set the scaling factor of the character image to a scaling factor that makes the size of the characters greater than or equal to the minimum character size. In this case, the originally small characters are displayed larger. This can improve the legibility of the characters.

2. Second Embodiment

2-1. Functional Overview of System Controller

Figure 13A:
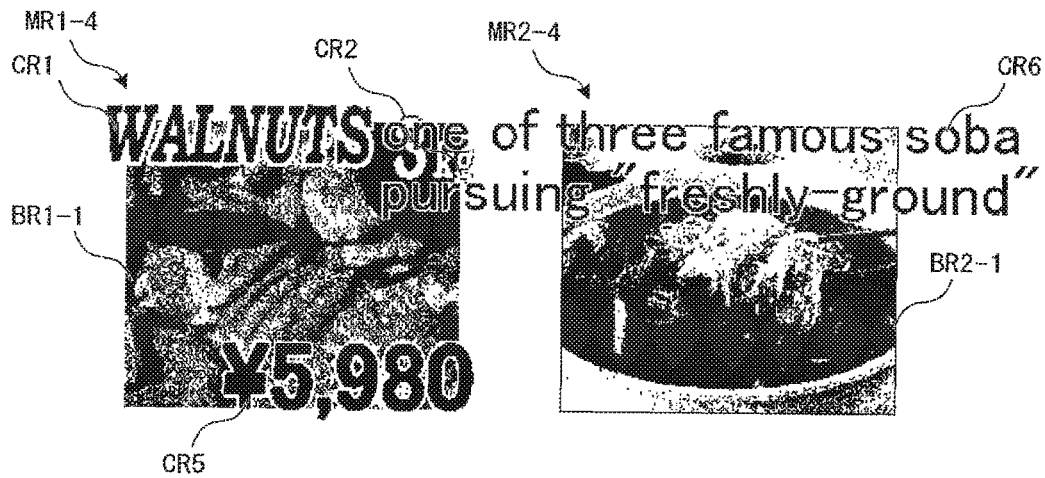
FIG. 13A is a diagram showing an example of displaying a plurality of scaled-down item images across which resized character images overlap.
Figure 13B:
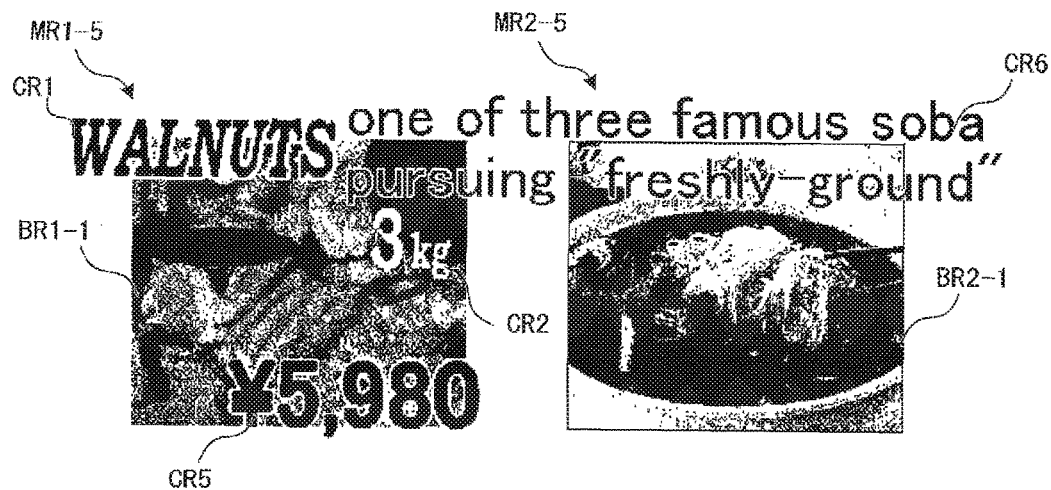
FIG. 13B is a diagram showing an example of displaying a plurality of scaled-down item images whose display positions have been adjusted so that a resized character image extending out from a corresponding scaled-down background image is positioned not to overlap with another resized character image.

The following describes a functional overview of the system controller 14 according to a second embodiment with reference to FIGS. 13A and 13B. In the second embodiment, when a plurality of scaled-down item images are displayed, the adjuster 143 adjusts the display position of at least one resized character image in at least one of the scaled-down item images so that the at least one resized character image is positioned to extend out from the corresponding scaled-down background image. In this case, the system controller 14 adjusts the display position of at least either the resized character image extending out from the scaled-down background image in the corresponding scaled-down item image or a resized character image in another scaled-down background image so that the resized character image extending out does not overlap with the resized character image. This can improve the legibility of characters.

As described in the first embodiment, the adjuster 143 adjusts the display position of a resized character image so that the resized character image is positioned within a character displayable area. Thus, when character displayable areas corresponding one-to-one to a plurality of scaled-down item images do not overlap, it is basically unnecessary to adjust the display positions of character images so that the character images do not overlap between different scaled-down item images. However, for example, there are cases where a plurality of scaled-down item images are simultaneously displayed within one character displayable area. Alternatively, there are cases where no particular character displayable area is determined when a plurality of scaled-down item images are displayed simultaneously. In these cases, if the display position of a character image is adjusted separately for each scaled-down item image, some character images may overlap between the corresponding scaled-down item images.

FIG. 13A is a diagram showing an example of displaying a plurality of scaled-down item images across which resized character images overlap. As shown in FIG. 13A, scaled-down item images MR1-4 and MR2-4 are being displayed simultaneously. The scaled-down item image MR1-4 includes the scaled-down background image BR1-1 and the resized character images CR1, CR2, and CR5. The scaled-down item image MR2-4 includes a scaled-down background image BR2-1 and a resized character image CR6. As in the first embodiment, for example, assume for the scaled-down item image MR1-4 that the adjuster 143 adjusts the display positions of the resized character images CR1, CR2, and CR5 so that these resized character images do not overlap. Also assume for the scaled-down item image MR2-4 that no display position is adjusted because there is only one resized character image. Then, as shown in FIG. 13A, the resized character images CR2 and CR6 overlap.

To avoid such a situation, for example, the adjuster 143 may adjust the display position of at least one resized character image so that all resized character images in every scaled-down item image displayed simultaneously do not overlap. For example, when using an algorithm based on the force-directed drawing model or the least-squares method described in the first embodiment, the adjuster 143 can adjust the display positions of all the resized character images displayed simultaneously, by setting the display coordinates and the reference coordinates of every resized character image as parameters for the algorithm. Alternatively, for example, the adjuster 143 may detect overlapping resized character images among all the resized character images and then change the display positions of all or some of the detected resized character images so as to eliminate the overlap between the detected resized character images. The adjuster 143 may repeat such a process until the overlap between all the resized character images is eliminated.

FIG. 13B is a diagram showing an example of displaying a plurality of scaled-down item images whose display positions have been adjusted so that a resized character image extending out from a corresponding scaled-down background image is positioned not to overlap with another resized character image. As shown in FIG. 13B, scaled-down item images MR1-5 and MR2-5 are being displayed simultaneously. The scaled-down item image MR1-5 includes the scaled-down background image BR1-1 and the resized character images CR1, CR2, and CR5. The scaled-down item image MR2-5 includes the scaled-down background image BR2-1 and the resized character images CR6. FIG. 13B differs from FIG. 13A in that the display positions of the resized character images CR2 and CR6 are adjusted so that overlap between these images is eliminated.

When causing a resized character image to extend out from a scaled-down background image corresponding to this, the adjuster 143 may or may not allow the resized character image to overlap with another scaled-down background image. In the example shown in FIG. 13B, part of the resized character image CR6 is overlaid on the scaled-down background image BR1-1. Even when a resized character image extends out from the corresponding scaled-down background image, the adjuster 143 desirably adjusts the display position of the resized character image so that at least part of the resized character image is positioned within the area for the corresponding scaled-down background image. However, the entirety of the resized character image may be positioned outside the area for the corresponding scaled-down background image.

2-2. How Information Processing System Works

Figure 14:
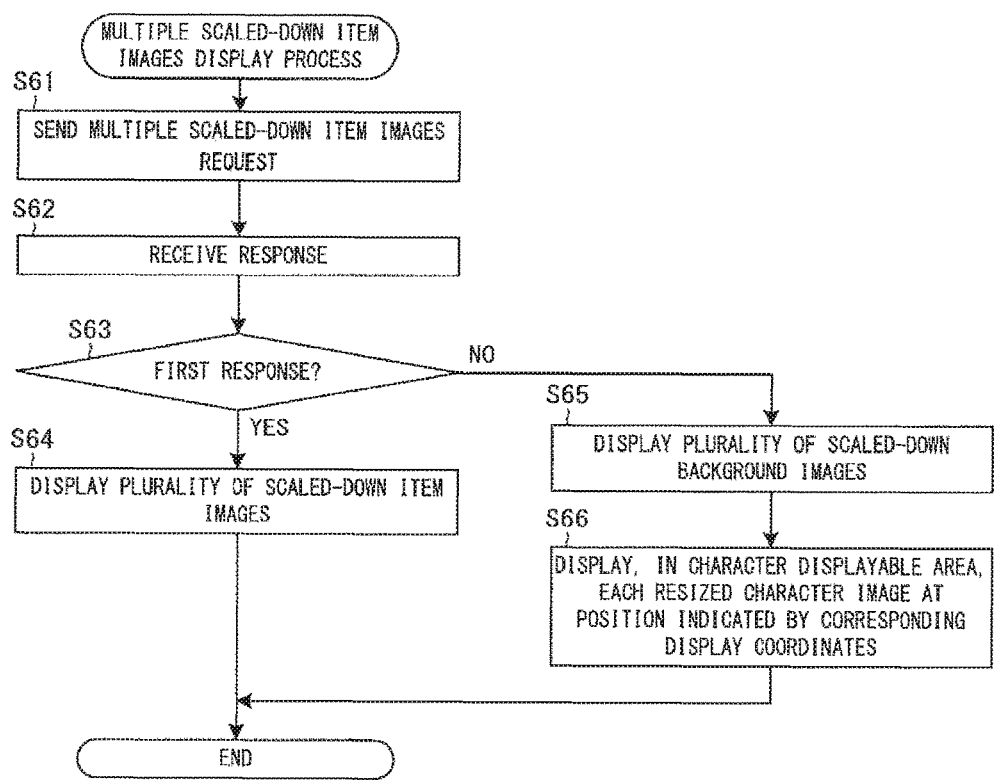
FIG. 14 is a flowchart showing an example of a multiple scaled-down item images display process in a controller of a user terminal 3 according to an embodiment.
Figure 15:
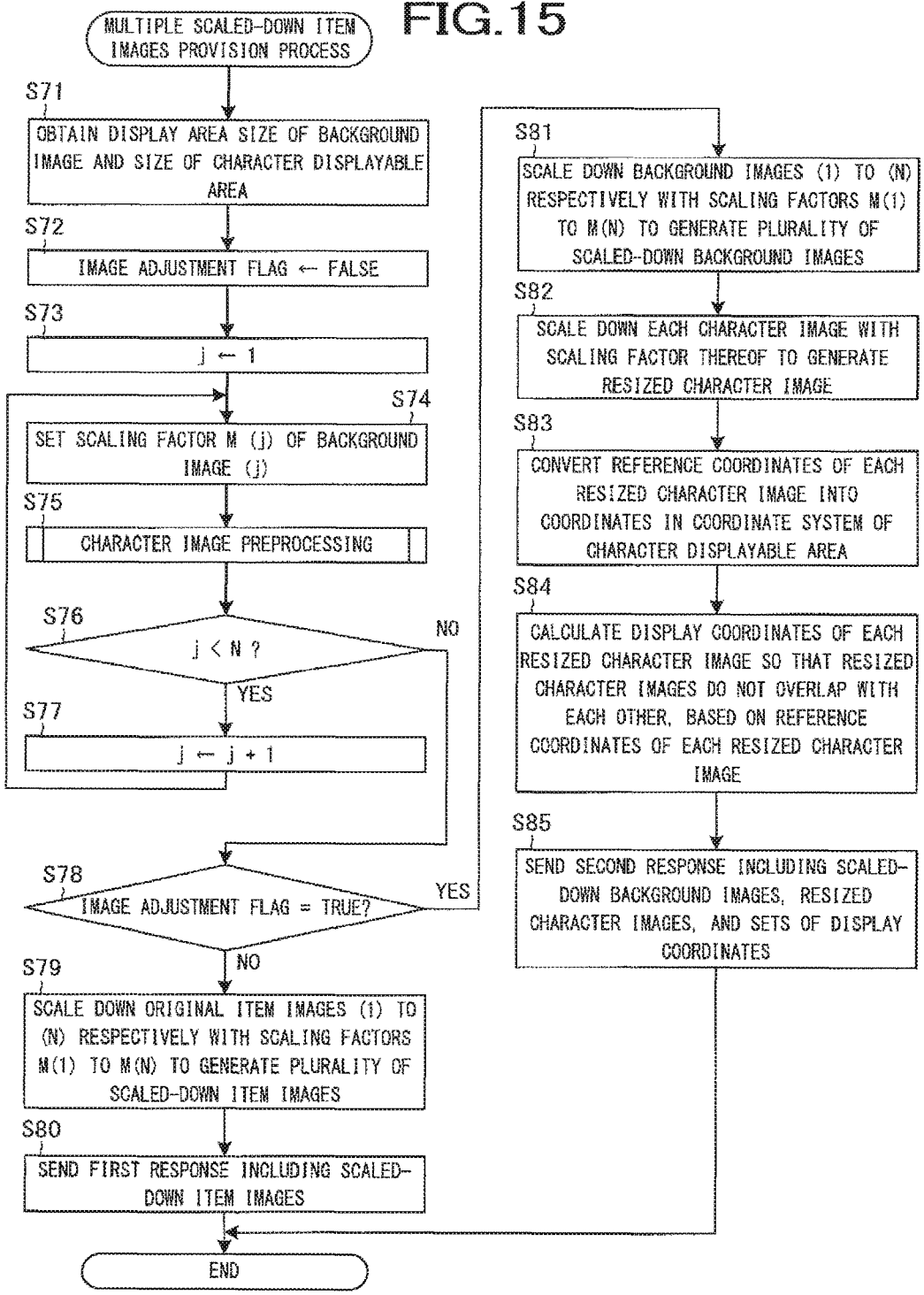
FIG. 15 is a flowchart showing an example of a multiple scaled-down item images provision process in the system controller 14 of the online marketplace server 1 according to an embodiment.

The following describes how the information processing system S works, with reference to FIGS. 14 and 15. FIG. 14 is a flowchart showing an example of a multiple scaled-down item images display process in the controller of a user terminal 3 according to this embodiment.

When only one scaled-down item image is displayed on a web page, the information processing system S may work in the same manner as in the first embodiment. Also when a plurality of scaled-down item images are displayed on a web page, the information processing system S may work in the same manner as in the first embodiment if character displayable areas of the plurality of scaled-down background images do not overlap. This is because, in this case, the online marketplace server 1 only needs to adjust, for each scaled-down item image separately sent from the user terminal 3, the display position of a corresponding resized character image and provide the scaled-down item image.

When a plurality of scaled-down item images are displayed in one character displayable area on a web page, for example, a program for displaying the plurality of scaled-down item images may be written in an HTML document for the web page. The controller of the user terminal 3 executes the program written in this HTML document received from the online marketplace server 1. The controller of the user terminal 3 executes this program to perform the multiple scaled-down item images display process.

As shown in FIG. 14, the controller sends a multiple scaled-down item images request to the online marketplace server 1 in accordance with the program (Step S61). The multiple scaled-down item images request includes, for example, a plurality of image IDs. The multiple scaled-down item images request further includes, for example, the display area size of each scaled-down background image, the size of the character displayable area, and coordinates indicating the position of the scaled-down background image of each scaled-down item image in the character displayable area.

FIG. 15 is a flowchart showing an example of a multiple scaled-down item images provision process in the system controller 14 of the online marketplace server 1 according to this embodiment. When the online marketplace server 1 receives the multiple scaled-down item images request from the user terminal 3, the system controller 14 performs the multiple item images provision process.

As shown in FIG. 15, the scaled-down image provider 144 obtains the plurality of image IDs, the display area size of each scaled-down background image, the size of the character displayable area, and the coordinates of the scaled-down background image of each scaled-down item image from the received multiple scaled-down item images request (Step S71). Subsequently, the adjuster 143 sets an image adjustment flag to FALSE (Step S72). The scaling factor setter 142 then sets a variable j to 1 (Step S73). Next, the scaling factor setter 142 selects the j-th image ID from among the image IDs obtained from the multiple scaled-down item images request. After that, the scaling factor setter 142 retrieves the background image corresponding to the selected image ID. The scaling factor setter 142 then sets the scaling factor M of the background image, based on the size of the background image and the display area size of the scaled-down background image (Step S74). A background image corresponding to the j-th image ID is referred to as a background image (j), and the scaling factor of the background image (j) is referred to as a scaling factor M (j). After that, the scaling factor setter 142 performs the character image preprocessing (Step S75). In the character image preprocessing, the scaling factor setter 142 sets, for each character image corresponding to the j-th image ID, the reference coordinates and the scaling factor of the character image. The details of the character image preprocessing are essentially the same as those in the first embodiment. Next, the scaling factor setter 142 determines whether the variable j is less than N that is the number of image IDs obtained from the multiple scaled-down item images request (Step S76). If the scaling factor setter 142 determines that the variable j is less than N (YES in Step S76), the process proceeds to Step S77. In Step S77, the scaling factor setter 142 adds 1 to the variable j, and the process proceeds to Step S74. On the other hand, if the scaling factor setter 142 determines that the variable j is not less than N (NO in Step S76), the process proceeds to Step S78.

In Step S78, the adjuster 143 determines whether the image adjustment flag is TRUE. If the adjuster 143 determines that the image adjustment flag is not TRUE (NO in Step S78), the process proceeds to Step S79. On the other hand, if the adjuster 143 determines that the image adjustment flag is TRUE (YES in Step S78), the process proceeds to Step S81.

In Step S79, the scaled-down image provider 144 retrieves, from the item image DB 12c, the plurality of original item images (1) to (N) corresponding one-to-one to the plurality of image IDs obtained from the multiple scaled-down item images request. Subsequently, the scaled-down image provider 144 scales down the original item images (1) to (N) respectively with the scaling factors M(1) to M(N) to generate a plurality of scaled-down item images. Next, the scaled-down image provider 144 sends a first response including the generated plurality of scaled-down item images to the user terminal 3 (Step S80) and then terminates the multiple scaled-down item images provision process. The first response is a response that instructs the user terminal 3 to display the plurality of scaled-down item images without modification.

In Step S81, the scaled-down image provider 144 scales down the background images (1) to (N) respectively with the scaling factors M(1) to M(N) to generate a scaled-down background images (1) to (N). Subsequently, the scaled-down image provider 144 identifies, for each of the image IDs obtained from the multiple scaled-down item images request, one or more character images whose scaling factors have been set in the character image scaling factor setting process, among one or more character images corresponding to the image ID. The scaled-down image provider 144 then scales down or up each of the identified one or more character images with the scaling factor of the character image to generate a resized character image (Step S82).

After that, the adjuster 143 converts the coordinate system of reference coordinates corresponding to every resized character image (Step S83). The coordinate system of the present reference coordinates differs from one image ID to another. Specifically, the coordinate system of the reference coordinates is, for example, a coordinate system with the origin located at the top left corner of the corresponding scaled-down background image. The adjuster 143 converts the reference coordinates of each resized character image into coordinates in a coordinate system with the origin located at the top left corner of the character displayable area, based on the coordinates of the scaled-down background image in the character displayable area.

Subsequently, the scaled-down image provider 143 adjusts the display position of at least one of all the resized character images corresponding to the plurality of image IDs obtained from the multiple scaled-down item images request so that these resized character images do not overlap with each other, based on the converted reference coordinates of each resized character image and on the size of the character displayable area (Step S84). Next, the scaled-down image provider 144 sends a second response including all of the scaled-down background images, the resized character images, and the adjusted sets of display coordinates to the user terminal 3 (Step S85). The scaled-down image provider 144 then terminates the multiple scaled-down item images provision process. The second response is a response that instructs the user terminal 3 to display each of the plurality of resized character images at the corresponding adjusted display coordinates.

As shown in FIG. 14, when the user terminal 3 receives the first response or the second response from the online marketplace server 1 (Step S62), the controller of the user terminal 3 determines whether the received response is the first response (Step S63). If the controller determines that the response is the first response (YES in Step S63), the process proceeds to Step S64. On the other hand, if the controller determines that the response is not the first response (NO in Step S63), the process proceeds to Step S65.

In Step S64, the controller displays each of the plurality of scaled-down item images included in the first response, in the image display area of the corresponding scaled-down background. The controller then terminates the multiple scaled-down item images display process.

In Step S65, the controller displays each of the plurality of scaled-down background images included in the second response, in the display area of the corresponding scaled-down background image. Subsequently, based on the sets of display coordinates included in the second response, the controller displays each of the plurality of resized character images included in the second response at the corresponding display coordinates in the character displayable area (Step S66). The controller then terminates the multiple scaled-down item images display process.

As described above, according to this embodiment, the system controller 14 sets the scaling factors of background images extracted from a plurality of original item images and the scaling factors of a plurality of character images extracted from the plurality of original item images. The system controller 14 then adjusts at least one of a plurality of resized character images so that the at least one resized character image is positioned to partially extend out from the area for a scaled-down background image corresponding to the resized character image, among a plurality of scaled-down background images. The system controller 14 also adjusts the display position of either the resized character image extending out from the area for the scaled-down background image or a resized character image corresponding to another scaled-down background image so that these resized character image are positioned not to overlap with each other. This can improve the legibility of characters also when a plurality of scaled down item images are displayed simultaneously.

3. Third Embodiment 3-1. Functional Overview of System Controller

Figure 16:
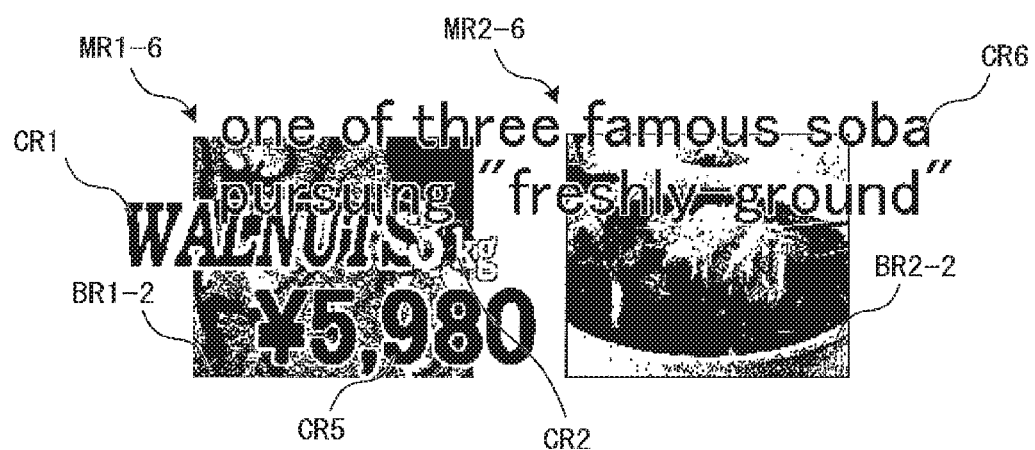
FIG. 16 is a diagram showing an example of displaying a plurality of scaled-down item images across which resized character images overlap.
Figure 17A:
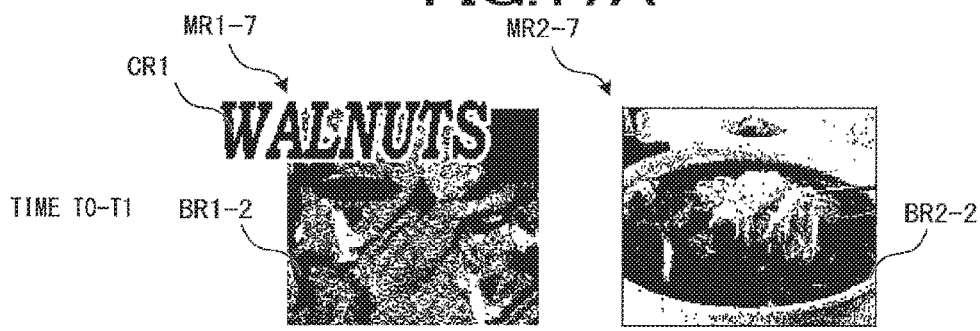
FIGS. 17A to 17D are diagrams showing an example of displaying a plurality of scaled-down item images whose resized character images have been adjusted in display timing.
Figure 17B:
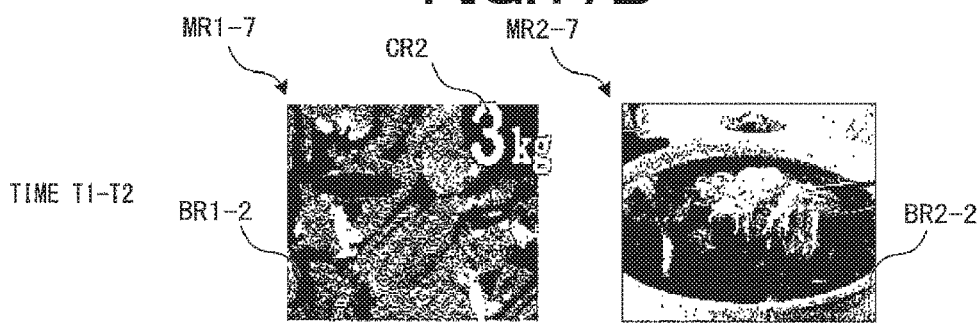
Figure 17C:
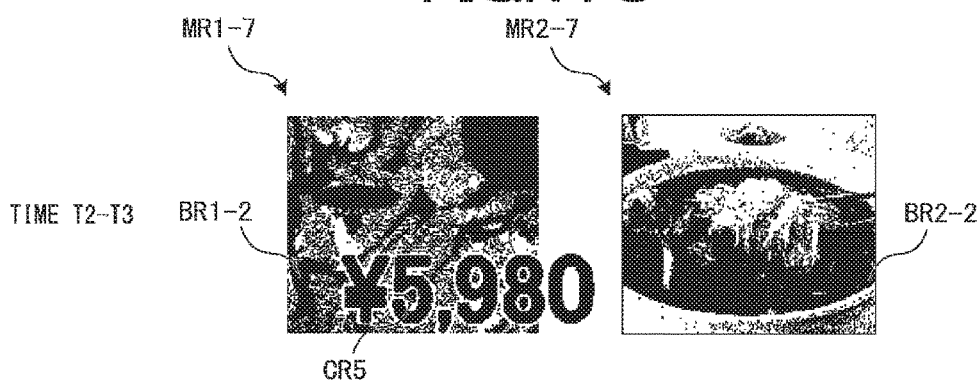
Figure 17D:

The following describes a functional overview of the system controller 14 according to a third embodiment with reference to FIGS. 16 to 17D. In the third embodiment, as an example of adjusting a resized character image, the adjuster 143 adjusts the display timing of the resized character image. Specifically, when two or more of a plurality of resized character images extracted from an original item image overlap, the adjuster 143 makes the display timings of at least the two or more resized character images different from each other. This prevents, while one of the resized character images that overlap with each other is being displayed, the other resized character images from being displayed. This eliminates the overlap between the resized character images, thus improving the legibility of characters. The display state of the resized character image in this case is the timing at which a resized character image of interest among the plurality of resized character images is displayed. The display state of the surrounding area of the resized character image in this case is the timing at which resized character image(s) except the resized character image of interest, among the plurality of resized character images, is displayed. The relationship between these display states is the relationship between the display timing of the resized character image of interest and the display timing of other resized character image(s).

For example, instead of adjusting the display position(s) of resized character image(s) as described in the first or second embodiment, the adjuster 143 may adjust the display timings of resized character images. Alternatively, only when the adjustment of the display position(s) fails to eliminate overlap between some of the resized character images, the adjuster 143 may adjust the display timings of resized character images.

The adjuster 143 may adjust the display timings of only resized character images that overlap with each other so that the other resized character images is continuously displayed. Alternatively, the adjuster 143 may adjust the display timings of all resized character images, including the resized character images that overlap with each other and the other resized character images.

FIG. 16 is a diagram showing an example of displaying a plurality of scaled-down item images across which resized character images overlap. As shown in FIG. 16, scaled-down item images MR1-6 and MR2-6 are being displayed simultaneously. The scaled-down item image MR1-6 includes a scaled-down background image BR1-2 and the resized character images CR1, CR2, and CR5. The scaled-down item image MR2-6 includes a scaled-down background image BR2-2 and the resized character image CR6. The resized character images CR1, CR2, and CR6 overlap if their display timings are not adjusted.

FIGS. 17A to 17D are diagrams showing an example of displaying a plurality of scaled-down item images whose resized character images have been adjusted in display timing. In FIGS. 17A to 17D, a scaled-down item image MR1-7 is the scaled-down item image MR1-6 whose resized character image has been adjusted in display timing. A scaled-down item image MR2-7 is the scaled-down item image MR2-6 whose resized character image has been adjusted in display timing. The scaled-down background image BR1-2 in the scaled-down item image MR1-7 and the scaled-down background image BR2-2 in the scaled-down item image MR2-7 is continuously displayed.

For example, as shown in FIG. 17A, the resized character image CR1 is displayed on a scaled-down background image BR1-2, between a time T0, at which the scaled-down item images MR1-7 and MR2-7 start to be displayed, and a time T1. The other resized character images are not displayed. When displaying each resized character image at a different timing, the user terminal 3 may apply a visual effect to the resized character image to display. For example, the user terminal 3 may apply, to each resized character image, an animation effect that scales up the resized character image to a size corresponding to a set scaling factor.

Subsequently, as shown in FIG. 17B, for example, the resized character image CR2 is displayed on the scaled-down background image MR1-7, between the time T1 and a time T2. The other resized character images are not displayed. Then, as shown in FIG. 17C, for example, the resized character image CR5 is displayed on the scaled-down background image BR1-2, between the time T2 and a time T3. The other resized character images are not displayed. Next, as shown in FIG. 17D, for example, the resized character image CR6 is displayed on the scaled-down background images BR1-2 and BR2-2, between the time T3 and a time T4. The other resized character images are not displayed. After that, the displays shown in FIGS. 17A to 17D are repeated. The resized character image CR5 does not overlap with any other resized character images. Thus, the resized character image CR5 may be continuously displayed.

FIG. 17A to 17D show an example based on the assumption that the display position(s) of resized character image(s) have been adjusted, which has been described in the second embodiment. However, for example, when adjusting, for each resized character image, the display position(s) of resized character image(s) as described in the first embodiment, the adjuster 143 may adjust the display timings of resized character images.

When causing a plurality of resized character images to be displayed one after another, the adjuster 143 may cause an especially important resized character image among other important resized character images, for example, based on the levels of importance of the plurality of resized character images.

The display duration for which a resized character image whose display timing is adjusted remains displayed may be common to all the resized character images. For example, the display duration may be preset. Alternatively, the adjuster 143 may set a display duration for each resized character image. For example, a time required for a person to understand a character group that expresses some meaning in one or more characters is referred to as a stay time, and a time required for eyes to move one character group to another is referred to as a jump time. For example, the stay time and the jump time may be preset. In this case, the adjuster 143 may identify the number of character groups from the character image. For example, the adjuster 143 may identify character groups by performing a morphological analysis of characters recognized from the character image. The adjuster 143 may multiply the sum of the stay time and the jump time by the number of the character groups to calculate the display duration. Alternatively, the user terminal 3 may determine the display duration. For example, the display duration may vary among the user terminals 3 or among the types of the user terminals 3.

The adjuster 143 may determine the order in which the resized character images are to be displayed, based on a predetermined criterion. For example, the adjuster 143 may determine the display order so that the resized character images will be displayed in order from left to right or from top to bottom. Alternatively, the adjuster 143 may determine the display order regardless of in what order the resized character images are arranged. Alternatively, for example, the user terminal 3 may determine the display order.

3-2. How Information Processing System Works

Figure 18:
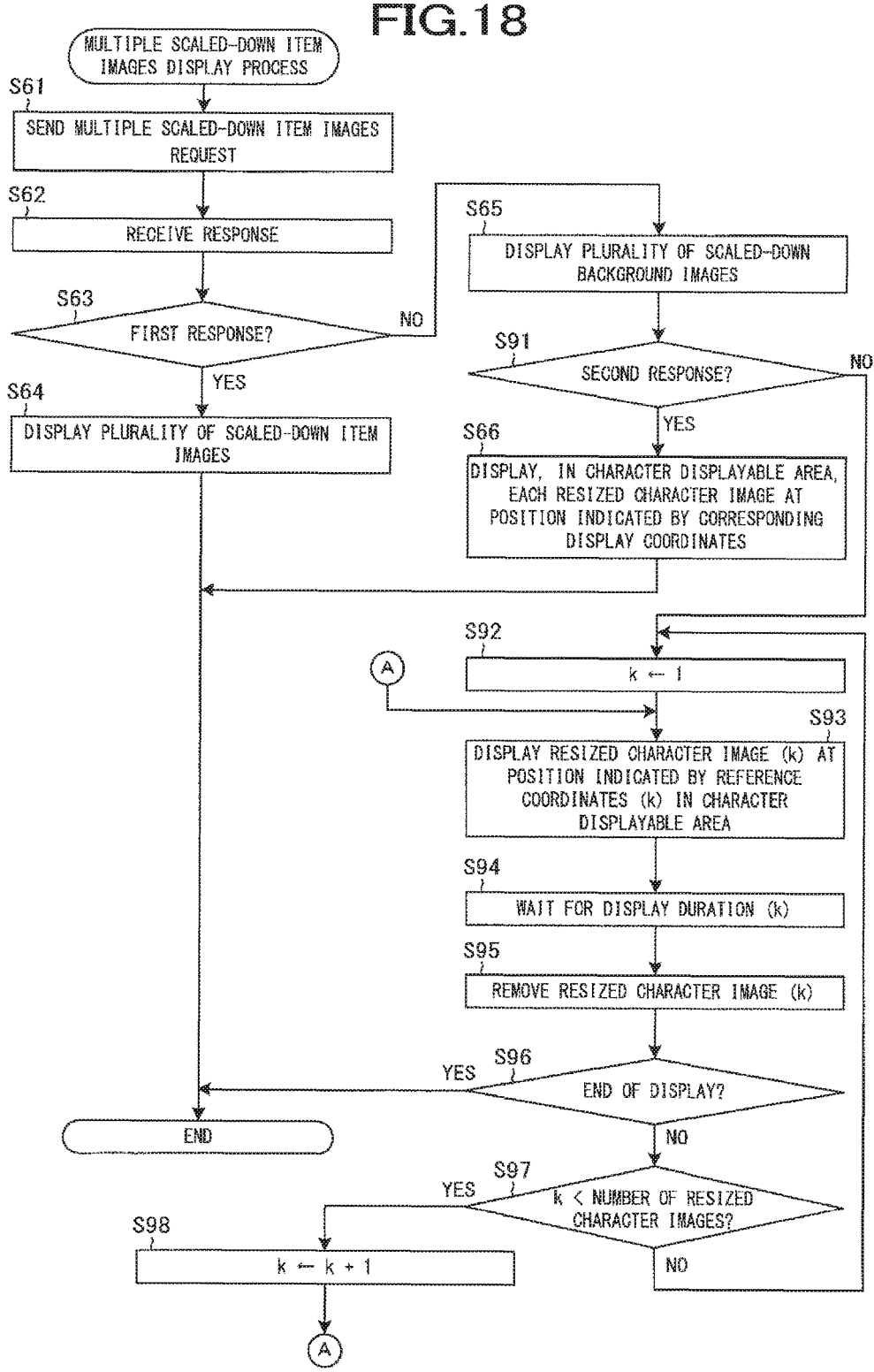
FIG. 18 is a flowchart showing an example of the multiple scaled-down item images display process in a controller of the user terminal 3 according to an embodiment.

The following describes how the information processing system S works, with reference to FIGS. 18 and 19. FIG. 18 is a flowchart showing an example of a multiple scaled-down item images display process in the controller of a user terminal 3 according to this embodiment. In FIG. 18, the same steps as in FIG. 14 are denoted by the same reference signs. As shown in FIG. 18, the controller of the user terminal 3 sends a multiple scaled-down item images request to the online marketplace server 1 (Step S61).

FIG. 19 is a flowchart showing an example of the multiple scaled-down item images provision process in the system controller 14 of the online marketplace server 1 according to this embodiment. In FIG. 19, the same steps as in FIG. 15 are denoted by the same reference signs.

As shown in FIG. 19, Steps S71 to S78 are performed. If the image adjustment flag is not TRUE, then Steps S79 and S80 are performed. On the other hand, if the image adjustment flag is TRUE, then Steps S81 to S84 are performed. These steps are the same as those in the second embodiment.

After Step S84, the adjuster 143 determines, based on the adjusted display coordinates of each resized character image, whether two or more of all the resized character images overlap (Step S101). If the adjuster 143 determines that no resized character images overlap (NO in Step S101), the process proceeds to Step S85. The scaled-down image provider 144 sends a second response to the user terminal 3, and then terminates the multiple scaled-down item images provision process. On the other hand, if the adjuster 143 determines that two or more resized character images overlap (YES in Step S101), the process proceeds to Step S102.

In Step S102, the adjuster 143 determines a display duration for each resized character image. For example, the adjuster 143 retrieves texts in each resized character image from the item image DB 12c. The adjuster 143 then extracts, for each resized character image, character groups from the texts to count the number of character groups. Next, the adjuster 143 retrieves the sum of the stay time and the jump time from the storage unit 12. The adjuster 143 then multiplies, for each resized character image, the number of character groups and the retrieved sum to calculate a display duration.

After that, the scaled-down image provider 144 sends a third response including all of the scaled-down background images, the resized character images, the adjusted sets of display coordinates, and the display durations to the user terminal 3 (Step S103). The scaled-down image provider 144 then terminates the multiple scaled-down item images provision process. The third response is a response that instructs the user terminal 3 to display the plurality of resized character images at mutually different timings.

As shown in FIG. 18, when the user terminal 3 receives one of the first to third responses from the online marketplace server 1 (Step S62), the controller of the user terminal 3 determines whether the received response is the first response (Step S63). If it determines that the response is the first response (YES in Step S63), the controller terminates the multiple scaled-down item images display process.

On the other hand, if it determines that the response is not the first response (NO in Step S63), the controller displays each of the plurality of scaled-down background images included in the second response or the third response in the display area of the corresponding scaled-down background image (Step S65). Subsequently, the controller determines whether the received response is the second response (Step S91). If it determines that the response is the second response (YES in Step S91), the controller displays each of the plurality of resized character images included in the second response at the corresponding display coordinates (Step S66). The controller then terminates the multiple scaled-down item images display process. On the other hand, if the controller determines that the response is the third response (NO in Step S91), the process proceeds to Step S92.

In Step S92, the controller sets a variable k to 1. Subsequently, the controller obtains the k-th resized character image to be displayed among the resized character images included in the third response. The controller also obtains the display coordinates and the display duration that correspond to the k-th resized character image, from the third response. The controller then displays the obtained resized character image at the obtained display coordinates in the character displayable area (step S93).

Next, the controller waits for the obtained display duration (Step S94). The controller then removes the displayed resized character image from the screen (Step S95).

After that, the controller determines whether the display of the web page ends (Step S96). If the controller determines that the display of the web page does not end (NO in Step S96), the process proceeds to Step S97. In Step S97, the controller determines whether the variable k is less than the number of resized character images included in the third response. If the controller determines that the variable k is less than the number of the resized character images (YES in Step S97), the process proceeds to Step S98. In Step S98, the controller adds 1 to the variable k, and the process proceeds to Step S93. On the other hand, if the controller determines that the variable k is not less than the number of the resized character images (NO in Step S97), the process proceeds to Step S92. If it determines that the display of the web page ends (YES in Step S96), the controller terminates the multiple scaled-down item images display process.

As described above, according to this embodiment, when a plurality of character images are extracted from an original item image and two or more of a plurality of resized character images overlap, the system controller 14 makes the display timings of at least these resized character images different from each other. This eliminates the overlap, thus improving the legibility of characters.

4. Fourth Embodiment 4-1. Functional Overview of System Controller

Figure 20A:
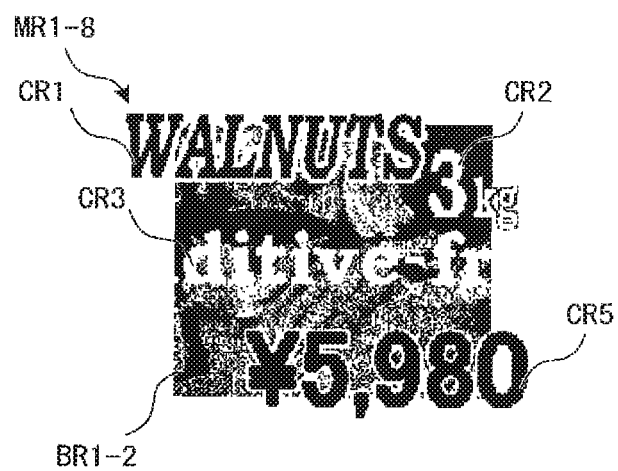
FIG. 20A is a diagram showing an example of displaying a scaled-down item image having an unoutlined resized character image.
Figure 20B:
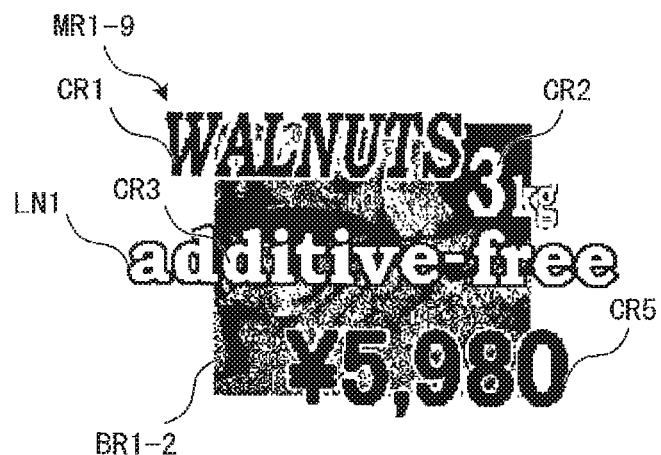
FIG. 20B is a diagram showing an example of displaying a scaled-down item image to which borders have been added.

The following describes a functional overview of the system controller 14 according to a fourth embodiment with reference to FIGS. 20A and 20B. In the fourth embodiment, as an example of adjusting at least either a resized character image or a scaled-down background image, the adjuster 143 adjusts the color of at least either the resized character image or the scaled-down background image. Specifically, the adjuster 143 increases the difference in color between the edge of the resized character image and a portion adjoining the edge of the resized character image in the scaled-down background image. This makes the boundary between the resized character image and the scaled-down background image clear, thus improving the legibility of characters. The display state of the resized character image in this case is the color of the edge of the resized character image. The display state of the surrounding area of the resized character image in this case is the color of a portion adjoining the edge of the resized character image in the scaled-down background image. The relationship between these display states is the difference in color between the edge of the resized character image and the adjoining portion.

The method for increasing the above color difference is not limited to a specific method. For example, the adjuster 143 may outline the resized character image with borders. In this case, the adjuster 143 may add borders to the edge of the resized character image or may add borders to the outside, that is, the background portion of the resized character image. Also for example, the adjuster 143 may add borders to both the edge and the outside of the resized character image.

When adding borders, the adjuster 143 determines the color of the borders. For example, the adjuster 143 preferably determines the color of the borders so that at least either the difference in color between the borders and the scaled-down background image or the difference in color between the resized character image and the borders is greater than the difference in color between the resized character image and the scaled-down background image. If this condition is met, the boundary between the resized character image and the scaled-down background image becomes clearer than before the borders are added. For example, the adjuster 143 may determine the color of the borders so that at least either the difference in color between the borders and the scaled-down background image or the difference in color between the resized character image and the borders is greater than or equal to a predetermined reference color difference. Alternatively, for example, the adjuster 143 may determine the color of the borders so that at least either the difference in color between the borders and the scaled-down background image or the difference in color between the resized character image and the borders is maximized. In the scaled-down background image, the portion adjoining the edge of the resized character image does not necessarily have only one color. In this case, the adjuster 143 may determine the color of the borders so that the difference between the color of the borders and the color closest to the color of the borders among the colors of the portion adjoining the edge of the resized character image is greater than or equal to the reference color difference or is maximized.

The adjuster 143 may determine the color of the borders, for example, based on a table indicating the correspondence between the color of the resized character image or the color of the portion adjoining the resized character image and the color of the borders. Alternatively, the adjuster 143 may calculate the color of the borders, for example, based on the color of the resized character image or the color of the portion adjoining the resized character image.

FIG. 20A is a diagram showing an example of displaying a scaled-down item image having an unoutlined resized character image. As shown in FIG. 20A, a scaled-down item image MR1-8 includes the scaled-down background image BR1-2 and the resized character images CR1 to CR3 and CR5. In the scaled-down item image MR1-8, the display positions of the resized character images CR1 to CR3 and CR5 have been adjusted. As shown in FIG. 4A, in the original item image, the boundary between the character image C3 corresponding to the resized character image CR3 and the background image B1 is relatively clear. However, the boundary between the resized character image CR3 and the scaled-down background image BR1-2 is unclear because the scaling factor of the character image C3 differs from the scaling factor of the background image B1 and the display position of the resized character image CR3 has been adjusted.

FIG. 20B is a diagram showing an example of displaying a scaled-down item image to which borders have been added. As shown in FIG. 20B, a scaled-down item image MR1-9 is an image obtained by adding a border LN1 to the resized character image CR3 in the resized character image MR1-8. This improves the legibility of characters shown by the resized character image CR3.

When the resized character image is already outlined with borders, for example, the adjuster 143 may change the color of the borders. In this case, the color of the borders may be determined in the same manner as the color of borders to be added is determined.

For example, the adjuster 143 may change the colors of the entire resized character image. If the color of the entire resized character image is changed, the color of the edge of the entire resized character image is also changed simultaneously. In this case, the adjuster 143 preferably determines the color of the resized character image so that the difference in color between the resized character image whose color has been changed and the scaled-down background image exceeds the difference in color between the resized character image whose color has not yet been changed and the scaled-down background image. For example, the adjuster 143 may determine the color of the resized character image so that the difference in color between the resized character image and the scaled-down background image becomes greater than or equal to a predetermined reference color difference. Alternatively, for example, the adjuster 143 may determine the color of the resized character image so that the difference in color between the resized character image and the scaled-down background image is maximized. Alternatively, the adjuster 143 may determine the color of the resized character image so that the difference between the color of the resized character image and a color close to the color of the resized character image among the colors of the portion adjoining the edge of the resized character image is greater than or equal to the reference color difference or is maximized.

The adjuster 143 may determine the color of the resized character image, for example, based on a table indicating the correspondence between the color of the resized character image and the color of the portion adjoining the resized character image Alternatively, the adjuster 143 may calculate the color of the resized character image, for example, based on the color of the portion adjoining the resized character image.

When the resized character image is allowed to extend out from the area for the scaled-down background image, at least part of the edge of the resized character image adjoins the background of the web page. In this case, the adjuster 143 may add borders, change the color of the borders, or change the color of the resized character image, for example, so as to increase the difference in color between the background of the web page and the resized character image.

For example, the adjuster 143 may add edge enhancement to a predetermined range of pixels from the edge of the resized character image. This enhances the outline of the resized character image, thus improving the legibility of characters. For example, the algorithm to add edge enhancement to a predetermined range of pixels from the edge is not limited to a specific algorithm. For example, the adjuster 143 may perform the edge enhancement using a Laplacian filter.

For example, the adjuster 143 may make an adjustment for increasing the difference in color between the edge of every resized character image and the adjoining portion. Alternatively, for example, the adjuster 143 may make an adjustment for increasing, only for a resized character image whose edge has a difference in color of less than a predetermined reference color difference from the adjoining portion, the difference in color between the edge of the resized character image and the adjoining portion.

The adjuster 143 may make an adjustment described in the fourth embodiment as well as an adjustment according to at least one of the first to third embodiments. Alternatively, the adjuster 143 may make an adjustment described in the fourth embodiment without making any adjustment according to the first to third embodiments.

4-2. How Information Processing System Works

Figure 21:
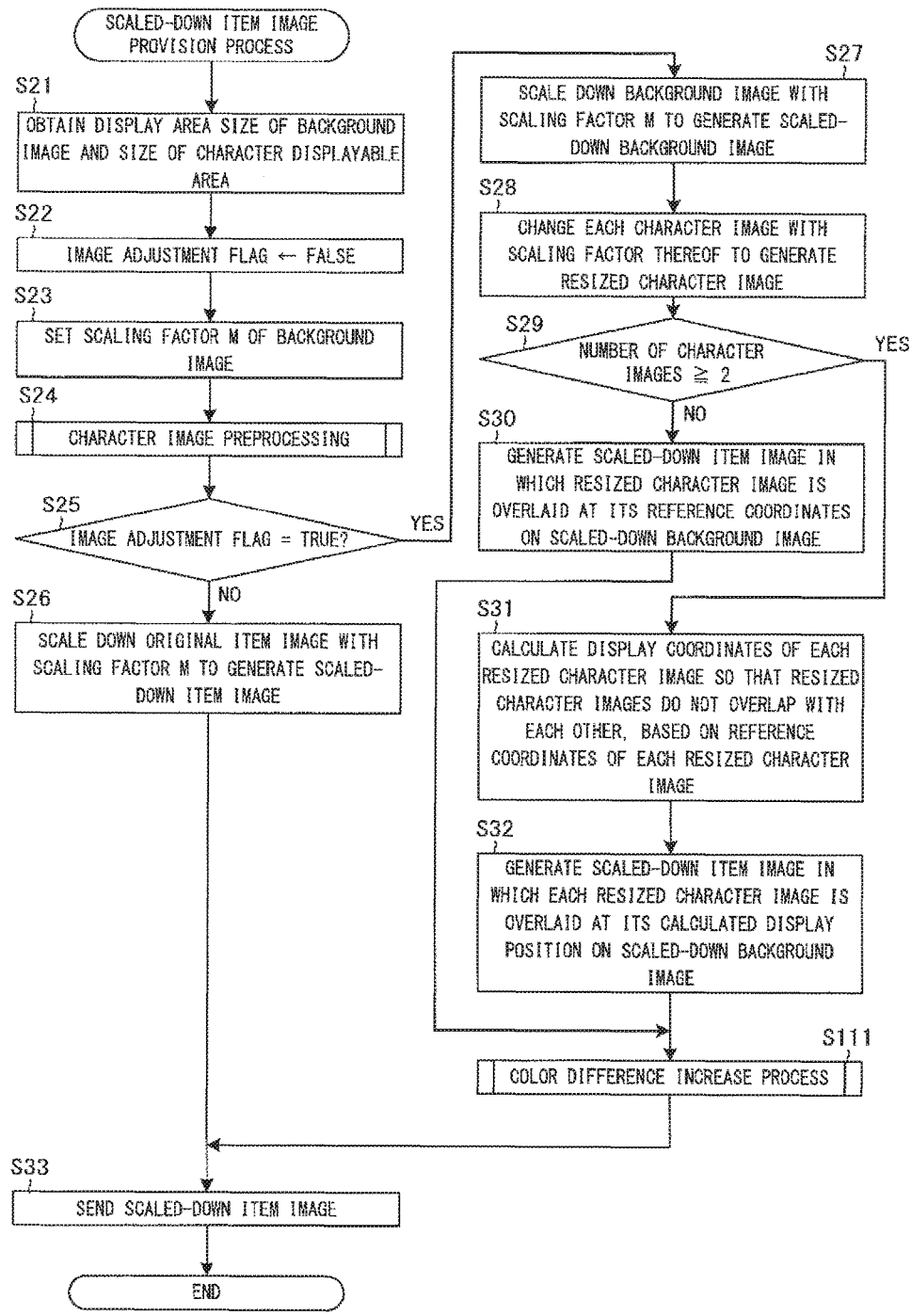
FIG. 21 is a flowchart showing an example of the scaled-down item image provision process in the system controller 14 of the online marketplace server 1 according to an embodiment.
Figure 22:
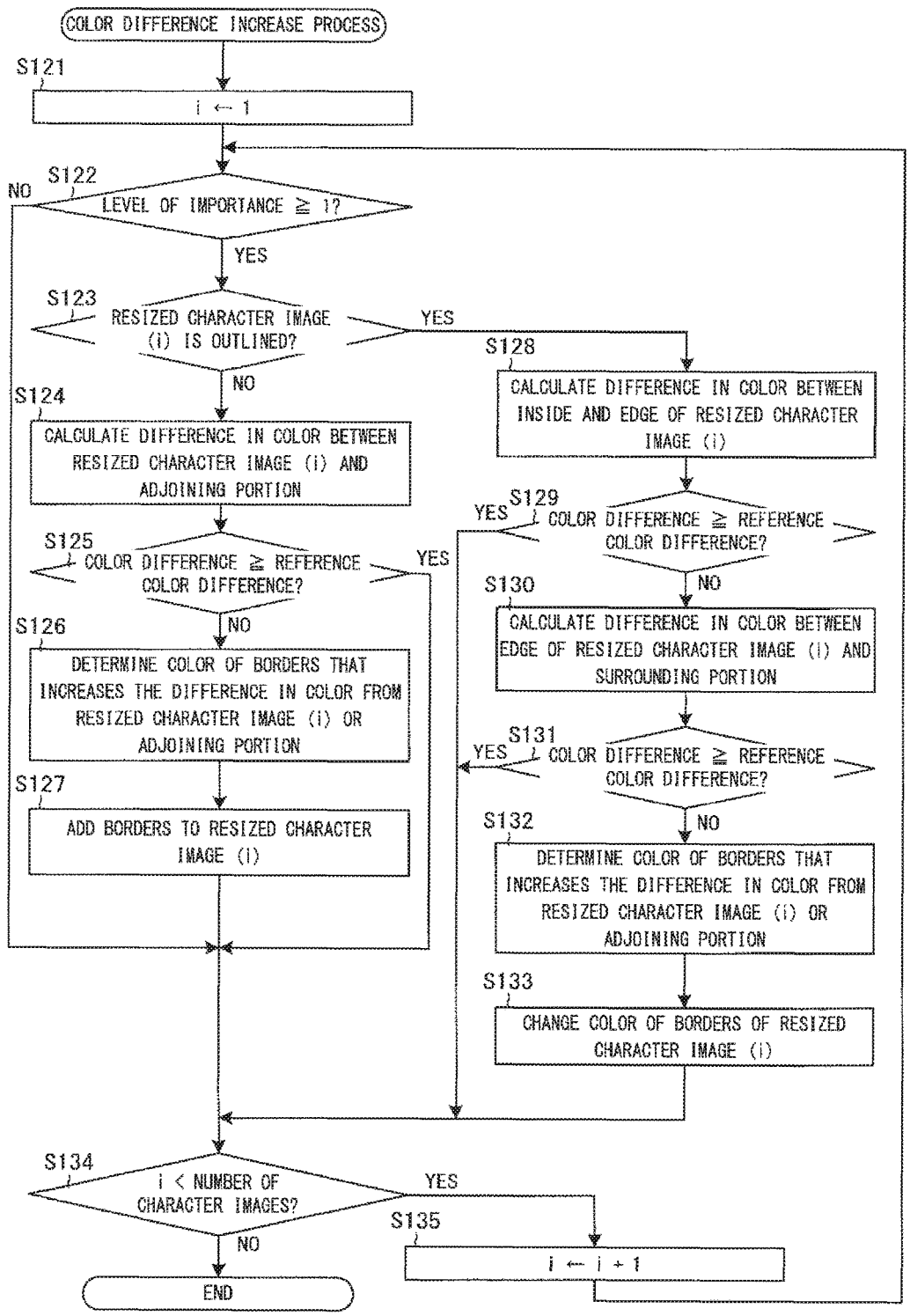
FIG. 22 is a flowchart showing an example of a color difference increase process in the system controller 14 of the online marketplace server 1 according to an embodiment.

The following describes how the information processing system S works, with reference to FIGS. 21 and 22. The following describes an example of how the system controller 14 adds borders or changes the color of borders. FIG. 21 is a flowchart showing an example of the scaled-down item image provision process in the system controller 14 of the online marketplace server 1 according to this embodiment. In FIG. 21, the same steps as in FIG. 10 are denoted by the same reference signs.

As shown in FIG. 21, Steps S21 to S25 are performed. If the image adjustment flag is not TRUE, then Steps S26 and S33 are performed. On the other hand, if the image adjustment flag is TRUE, Steps S27 to S29 are performed. If the number of the character images is not greater than or equal to two, then Step S30 is performed. On the other hand, if the number of the character images is greater than or equal to two, Steps S31 and S32 are performed. After Step S30 or Step S32, the adjuster 143 performs a color difference increase process (Step S111).

FIG. 22 is a flowchart showing an example of the color difference increase process in the system controller 14 of the online marketplace server 1 according to this embodiment. As shown in FIG. 22, the adjuster 143 sets a variable i to 1 (Step S121). Subsequently, the adjuster 143 selects the i-th resized character image from among the generated one or more resized character images. The i-th resized character image is referred to as a resized character image (i). Next, the adjuster 143 determines whether the level of importance of the resized character image (i) is greater than or equal to one (Step S122). If the adjuster 143 determines that the level of importance is not greater than or equal to one (NO in Step S122), the color difference increase process proceeds to S134. On the other hand, if the adjuster 143 determines that the level of importance is greater than or equal to one (YES in Step S122), the color difference increase process proceeds to Step S123.

In Step S123, the adjuster 143 determines whether the resized character image (i) is already outlined. For example, the adjuster 143 identifies the color of the edge of the resized character image (i). If the entire edge has the same color or similar colors, the adjuster 143 determine the color of the edge to be a provisional border color. Subsequently, the adjuster 143 determines whether the color of characters changes as a whole sharply from the provisional border color, for example, within a predetermined distance from the edge of the resized character image (i) toward the inside of the resized character image (i). If the color of the characters does not change from the provisional border color, the adjuster 143 determines that the resized character image (i) is not outlined (NO in Step S123). In this case, the adjuster 143 causes the color difference increase process to proceed to Step S124. On the other hand, if the color of the characters changes from the provisional border color, the adjuster 143 determines that the resized character image (i) is outlined (YES in Step S123). In this case, the adjuster 143 determines the provisional color to be the color of borders, and the color difference increase process proceeds to Step S128.

In Step S124, the adjuster 143 calculates the difference in color between the resized character image (i) and a portion adjoining the resized character image in the scaled-down background image. Subsequently, the adjuster 143 determines whether the calculated color difference is greater than or equal to the reference color difference stored in the storage unit 12 (Step S125). If the adjuster 143 determines that the calculated color difference is greater than or equal to the reference color difference (YES in Step S125), the color difference increase process proceeds to Step S134. On the other hand, if the adjuster 143 determines that the calculated color difference is not greater than or equal to the reference color difference (NO in Step S125), the color difference increase process proceeds to Step S126.

In Step S126, the adjuster 143 determines the color of borders to be added so that at least either the difference in color between the borders and the scaled-down background image or the difference in color between the resized character image (i) and the borders exceeds the calculated color difference. Subsequently, the adjuster 143 adds borders of the determined color at least either to the edge of the resized character image (i) or around the resized character image (i), in the scaled-down item image (Step S127). The adjuster 143 then causes the color difference increase process to proceed to Step S134.

In Step S128, the adjuster 143 calculates the difference in color between the borders of the resized character image (i) and the inside of the borders. The adjuster 143 then determines whether the calculated color difference is greater than or equal to the reference color difference (Step S129). If the adjuster 143 determines that the calculated color difference is greater than or equal to the reference color difference (YES in Step S129), the color difference increase process proceeds to Step S134. On the other hand, if the adjuster 143 determines that the calculated color difference is not greater than or equal to the reference color difference (NO in Step S129), the color difference increase process proceeds to Step S130.

In Step S130, the adjuster 143 calculates the difference in color between the borders of the resized character image (i) and a portion adjoining the borders in the scaled-down background image. The adjuster 143 then determines whether the calculated color difference is greater than or equal to the reference color difference (Step S131). If the adjuster 143 determines that the calculated color difference is greater than or equal to the reference color difference (YES in Step S131), the color difference increase process proceeds to Step S134. On the other hand, if the adjuster 143 determines that the calculated color difference is not greater than or equal to the reference color difference (NO in Step S131), the color difference increase process proceeds to Step S132.

In Step S132, the adjuster 143 determines the color of the existing borders so that at least either the difference in color between the borders and the scaled-down background image or the difference in color between the resized character image (i) and the borders exceeds the calculated color difference. Subsequently, the adjuster 143 fills the borders of the resized character image (i) with the determined color, in the scaled-down item image (Step S133). The adjuster 143 then causes the color difference increase process to proceed to Step S134.

In Step S134, the adjuster 143 determines whether the variable i is less than the number of the character images. If the adjuster 143 determines that the variable i is less than the number of the character images (YES in Step S134), the color difference increase process proceeds to S135. In Step S135, the adjuster 143 adds 1 to the variable i, and the color difference increase process proceeds to Step S122. On the other hand, if the adjuster 143 determines that the variable i is not less than the number of the character images (NO in Step S134), it terminates the color difference increase process.

When the color difference increase process ends, the scaled-down image provider 144 sends the scaled-down item image to the user terminal 3 (Step S33) and then terminates the scaled-down item image provision process, as shown in FIG. 21.

As described above, according to this embodiment, the system controller 14S increases the difference in color between the edge of a resized character image and a portion adjoining the edge of the resized character image in a scaled-down background image. Consequently, the boundary between the resized character image and the scaled-down background image becomes clear. This can improve the legibility of characters.

5. Fifth Embodiment 5-1. Functional Overview of System Controller

Figure 23:
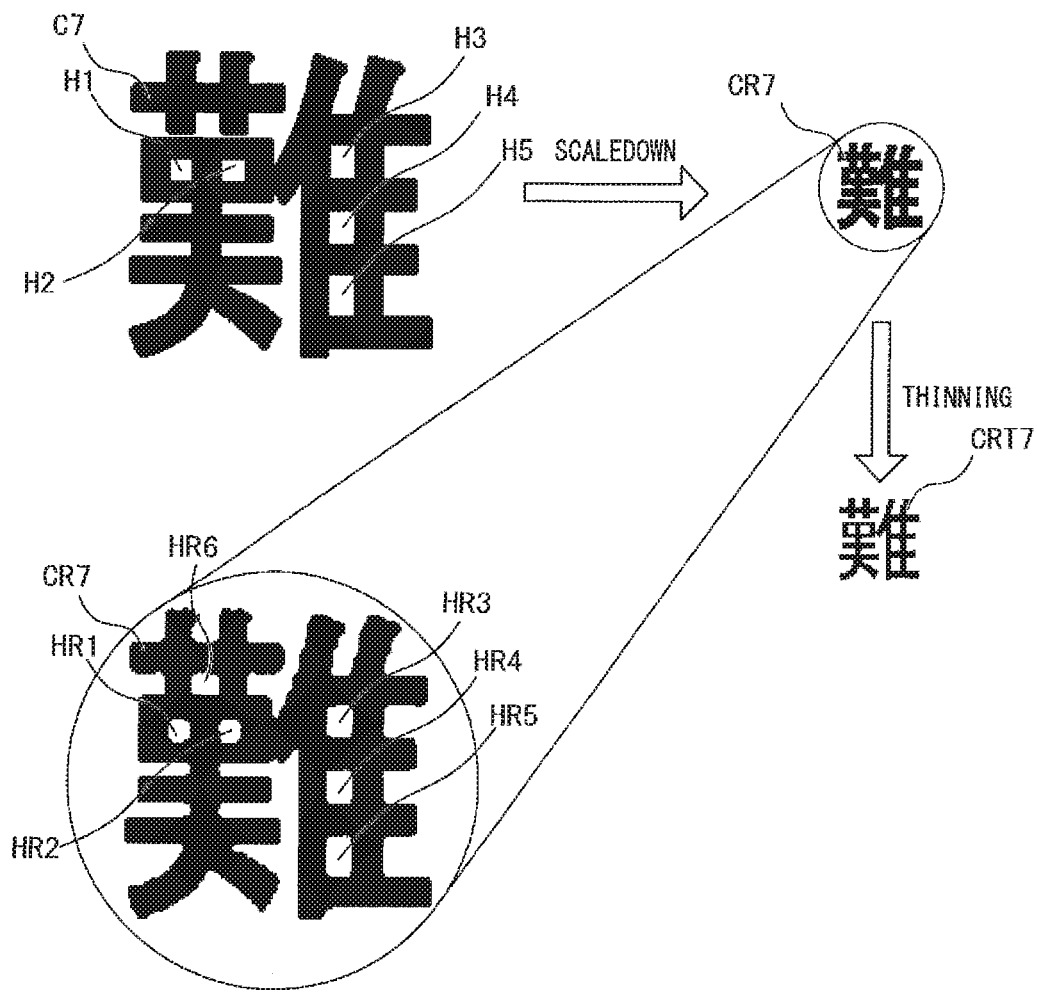
FIG. 23 is a diagram showing an example of thinning a character.

The following describes a functional overview of the system controller 14 according to a fifth embodiment with reference to FIG. 23. In the fifth embodiment, the adjuster 143 adjusts the thickness of characters shown by a resized character image, based on the area of the region enclosed by the resized character image, or adjusts the thickness of characters shown by a resized character image, based on the relationship between the area of the resized character image and the outline length of the resized character image.

When a character image is scaled down, the legibility of characters may be reduced by a reduction in the number of pixels that display the characters. That is, the characters are squashed. As a first example where characters become less legible, the area of the region enclosed by a resized character image become smaller than the area of the region enclosed by the original character image. The region enclosed by the character image or the resized character image is the region enclosed by the strokes forming characters shown by the character image or the resized character image. This region can be referred to as the openings in the character image. As these openings become smaller, it becomes more difficult to identify the strokes enclosing the openings. In some cases, the openings are closed by scaling down the character image.

The adjuster 143 may thin the strokes forming characters shown by a resized character image, for example, when the area of the openings is less than a preset reference area. That is, the adjuster 143 performs thinning of the characters. Thinning the strokes forming the characters makes the area of the openings larger, accordingly improving the legibility of the characters.

When a plurality of openings are formed in a resized character image, the area of each opening is identified. In this case, the adjuster 143 may determine whether to perform the thinning, by comparing the representative value of the areas of the plurality of openings with the reference area. The representative value may be, for example, the minimum value, the maximum value, the average value, or the median value of them.

The following shows a specific example. FIG. 23 is a diagram showing an example of thinning a character. As shown in FIG. 23, assume that a character image C7 is extracted from an original item image. The character image C7 shows a Chinese character. The region enclosed by the character image C7 includes openings H1 to H5. A resized character image CR7 is generated by scaling down the character image C7 with a certain scaling factor. The region enclosed by the resized character image CR7 includes openings HR1 to HR6. The openings HR1 to HR5 correspond one-to-one to the openings H1 to H5. Some of the strokes forming the character are joined together by scaling down the character. The opening HR6 is an opening resulting from the joined strokes. In this case, the adjuster 143 thins the character shown by the resized character image CR7 to generate a resized character image CRT7.

As a second example where characters become less legible, the proportion of the outline length of a resized character image to the area of the resized character image becomes lower than the proportion of the outline length of the original character image to the area of the original character image. This indicates how much the characters are squashed by scaling down the character image. The area for the resized character image and the area for the character image are each referred to as a character area. For example, as shown in FIG. 23, when corners formed by the character image are rounded off, the outline length of the character image becomes shorter. Also for example, when some of the strokes are joined together, the outline length becomes shorter.

The adjuster 143 may thin the strokes forming characters shown by a resized character image, for example, when the degree of reduction in the proportion of the outline length of the character area to the area of the character area is greater than a preset reference degree of reduction. This makes the proportion of the outline length to the area of the character area greater, thus improving the legibility of the characters.

To reduce the thickness of the characters, for example, the adjuster 143 may perform the thinning on the resized character image. Alternatively, for example, the adjuster 143 may perform the thinning on the original character image, and then scale down the character image, on which the thinning has been performed, to generate the resized character image again.

For example, to what extent the thinning should be performed and how thick the thinned characters should be may be preset. Alternatively, for example, the adjuster 143 may determine, based on the thickness of the characters shown by the resized character image, to what extent the thinning should be performed and how thick the thinned characters should be.

The adjuster 143 may perform both the thinning based on the area of the openings and the thinning based on the relationship between the area and the outline length of the character area, or may perform either of them.

The adjuster 143 may make an adjustment described in the fifth embodiment as well as an adjustment according to at least one of the first to fourth embodiments. Alternatively, the adjuster 143 may make an adjustment described in the fifth embodiment without making any adjustment according to the first to fourth embodiments.

5-2. How Information Processing System Works

Figure 24:
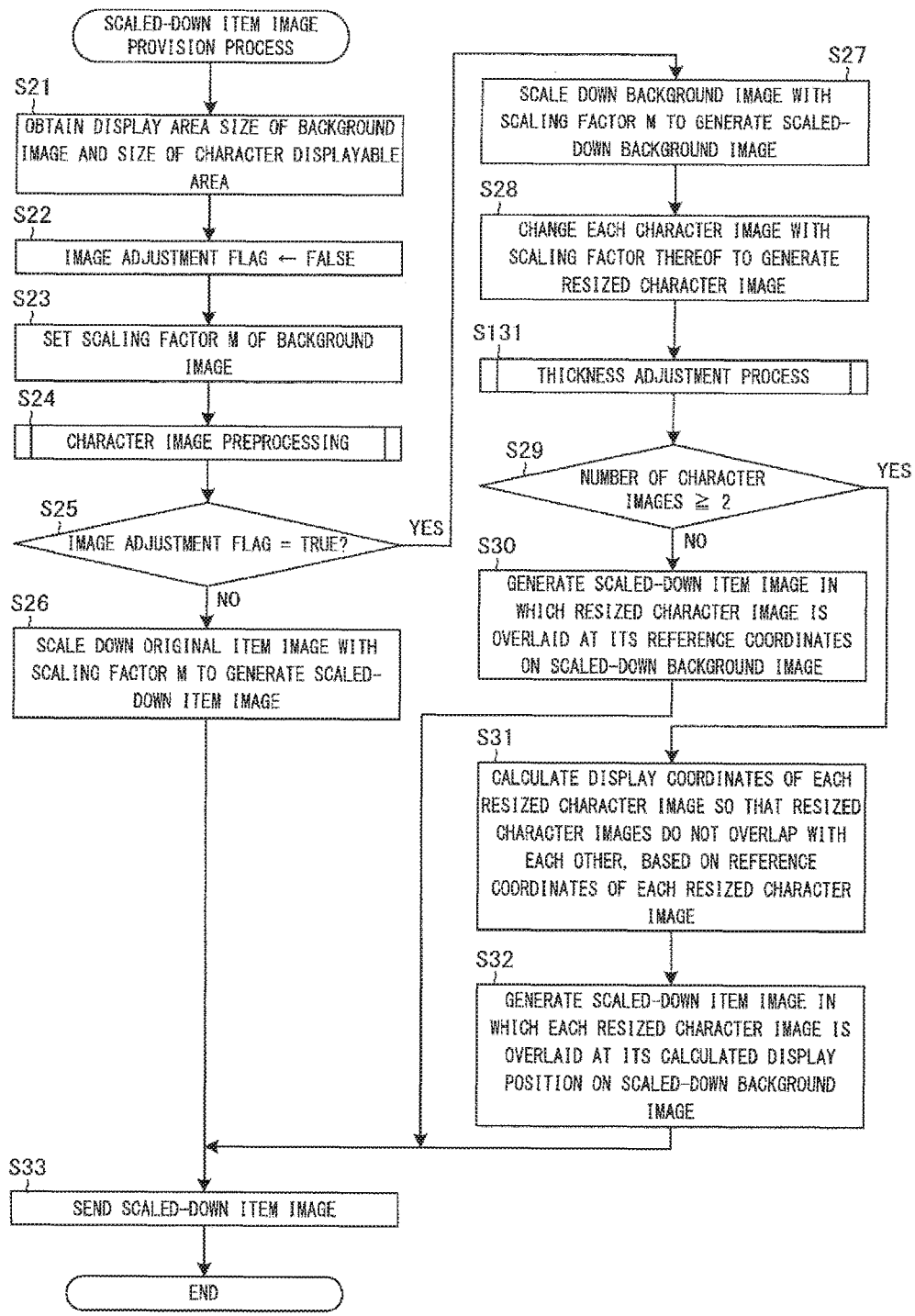
FIG. 24 is a flowchart showing an example of the scaled-down item image provision process in the system controller 14 of the online marketplace server 1 according to an embodiment.

The following describes how the information processing system S works, with reference to FIGS. 24 and 25. FIG. 24 is a flowchart showing an example of the scaled-down item image provision process in the system controller 14 of the online marketplace server 1 according to this embodiment. In FIG. 24, the same steps as in FIG. 10 are denoted by the same reference signs.

As shown in FIG. 24, Steps S21 to S25 are performed. If the image adjustment flag is not TRUE, then Steps S26 and S33 are performed. On the other hand, if the image adjustment flag is TRUE, Steps S27 to S28 are performed. After Step S28, the adjuster 143 performs a thickness adjustment process (Step S131).

FIG. 25 is a flowchart showing an example of the thickness adjustment process in the system controller 14 of the online marketplace server 1 according to this embodiment. As shown in FIG. 25, the adjuster 143 sets a variable i to 1 (Step S141). Subsequently, the adjuster 143 selects the i-th character image from among the one or more character images. The i-th character image is referred to as a character image (i). A resized character image generated by scaling down the character image (i) is referred to as a resized character image (i). Next, the adjuster 143 determines whether the level of importance of the resized character image (i) is greater than or equal to one (Step S142). If the adjuster 143 determines that the level of importance is not greater than or equal to one (NO in Step S142), the thickness adjustment process proceeds to Step S151. On the other hand, if the adjuster 143 determines that the level of importance is greater than or equal to one (YES in Step S142), the thickness adjustment process proceeds to Step S143.

In Step S143, the adjuster 143 extracts one or more openings from the character image (i) and also extracts one or more openings from the resized character image (i). The adjuster 143 then calculates the area of the one or more openings extracted from the resized character image (i). When calculating the area, the adjuster 143 determines, based on the positional relationship between the openings in the character image (i) and on the positional relationship between the openings in the resized character image (i), whether any of the openings extracted from the character image (i) are filled in the resized character image (i). If at least one of the openings is filled, the adjuster 143 determines the area of the opening to be zero.

Subsequently, the adjuster 143 determines whether the calculated area of the openings is less than the reference area stored in the storage unit 12 (Step S144). When the area of a plurality of openings is calculated, the adjuster 143 may compare the minimum value of the plurality of areas with the reference area. If the adjuster 143 determines that the area of the openings is not less than the reference area (NO in Step S144), the thickness adjustment process proceeds to Step S145. On the other hand, if the adjuster 143 determines that the area of the openings is less than the reference area (YES in Step S144), the thickness adjustment process proceeds to Step S149.

In Step S145, the adjuster 143 calculates the outline length of the character image (i) and the area of the character image (i). The adjuster 143 then divides the outline length by the area to calculate a proportion P1. Next, the adjuster 143 calculates the outline length of the resized character image (i) and the area of the resized character image (i). The adjuster 143 then divides the outline length by the area to calculate a proportion P2 (Step S146).

After that, the adjuster 143 calculates the difference between the proportion P1 and the proportion P2. The adjuster 143 then divides the calculated difference by the proportion P1 to calculate a relative degree of reduction in the outline (Step S147). Subsequently, the adjuster 143 determines whether the relative degree of reduction is greater than the reference degree of reduction stored in the storage unit 12 (Step S148). If the adjuster 143 determines that the relative degree of reduction is not greater than the reference degree of reduction (NO in Step S148), the thickness adjustment process proceeds to S151. On the other hand, if the adjuster 143 determines that the relative degree of reduction is greater than the reference degree of reduction (YES in Step S148), the thickness adjustment process proceeds to S149.

In Step S149, the adjuster 143 converts the character image (i) into a character image obtained by reducing the thickness of characters shown by the character image (i). The adjuster 143 then scales down the converted character image with the scaling factor of the character image (i) to generate the resized character image (i) again (Step S150). Next, the adjuster 143 causes the thickness adjustment process to proceed to Step S151.

In Step S151, the adjuster 143 determines whether the variable i is less than the number of the character images. If the adjuster 143 determines that the variable i is less than the number of the character images (YES in Step S151), the thickness adjustment process proceeds to S152. In Step S152, the adjuster 143 adds 1 to the variable i, and the thickness adjustment process proceeds to Step S142. On the other hand, if the adjuster 143 determines that the variable i is not less than the number of the character images (NO in Step S151), it terminates the thickness adjustment process.

When the thickness adjustment process ends, Step S29 is performed as shown in FIG. 24. If the number of the resized character images is not greater than or equal to two, then Steps S30 and S33 are performed. On the other hand, if the number of the resized character images is greater than or equal to two, Steps S31 to S33 are performed.

As described above, according to this embodiment, the system controller 14 adjusts the thickness of characters shown by a resized character image, based on at least either the area of the region enclosed by the resized character image or the relationship between the area of the resized character image and the outline length of the resized character image. This can improve the legibility of the characters.

6. Sixth Embodiment

The following describes a functional overview of the system controller 14 according to a sixth embodiment. In the sixth embodiment, as an example of adjusting a resized character image, the adjuster 143 scales up the resized character image. For example, the adjuster 143 may adjust the scaling factor of a character image, which is set by the scaling factor setter 142. When adjusting the scaling factor, the adjuster 143 makes a new scaling factor greater than the old scaling factor. The adjuster 143 may then scale up the character image, for example, with the new scaling factor to generate the resized character image again.

For example, assume that the difference in color between the edge of a resized character image and a portion adjoining the edge of the resized character image in a scaled-down background image is less than a reference color difference. In this case, for example, the adjuster 143 calculates the difference in color between the edge of a resized character image obtained by scaling up the current resized character image without causing the current resized character image to overlap with another resized character image and a portion adjoining the edge. Scaling up the resized character image affects which portion of the scaled-down background image adjoins the resized character image. The adjuster 143 may determine whether the calculated color difference is increased from the color difference before the resized character image is scaled up. If the calculated color difference is increased, then the adjuster 143 may scale up the resized character image. The display state of the resized character image in this case is the color of the edge of the resized character image. The display state of the surrounding area of the resized character image in this case is the color of a portion adjoining the edge of the resized character image in the scaled-down background image. The relationship between these display states is the difference in color between the edge of the resized character image and the adjoining portion.

In each embodiment described above, an information processing device according to the present invention is implemented on a server device that causes a terminal device to display scaled-down images. However, the information processing device according to the present invention may be implemented on a device that displays scaled-down images. That is, the information processing device may extract a character image and a background image from an image, set the scaling factors of the character image and the background image, adjust at least either the scaled down character image or the scaled down background image, and then display a resulting scaled-down image. Alternatively, a device different from the information processing device according to the present invention may extract the character image and the background image from the image.

In the above embodiments, the present invention is applied to cases where an original image is scaled down. The following describes that the present invention is applied to cases where an original image is scaled up. In this case, the information processing device sets the scaling factor of a background image extracted from an image to be greater than 100% or obtains a scaling factor greater than 100% as the scaling factor of the background image. The information processing device also sets the scaling factor of a character image extracted from the image to a scaling factor different from the scaling factor of the background image. For example, the information processing device may set the scaling factor of the character image to be greater than the scaling factor of the background image. Alternatively, for example, the information processing device may set the scaling factor of the character image to be smaller than the scaling factor of the background image as long as the character size of the character image scaled down is greater than or equal to a minimum character size. Ways to adjust at least either the character image changed in display size with the set scaling factor or the surrounding area of the character image may be the same as the ways described in the above embodiments.

REFERENCE SIGNS LIST

1 online marketplace server
2 store terminal
3 user terminal
11 communication unit
12 storage unit
12a member DB
12b item DB
12c item image DB
13 input/output interface
14 system controller
14a CPU
14b ROM
14c RAM
15 system bus
141 extractor
142 scaling factor setter
143 adjuster
144 scaled-down image provider
NW network
S information processing system

The invention claimed is:

1. An information processing device comprising:
   setting means for setting a second scaling factor used to display at least one character image extracted from at least one original image, the second scaling factor being different from a first scaling factor used to display at least one background image extracted from the at least one original image; and
   adjusting means for adjusting at least either the at least one character image changed in display size with the second scaling factor or the at least one background image changed in display size with the first scaling factor, based on a relationship between a display state of the at least one character image changed in display size with the second scaling factor and a display state of a surrounding area of the at least one character image changed in display size with the second scaling factor, the at least one character image changed in display size with the second scaling factor being overlaid on the at least one background image changed in display size with the first scaling factor.

2. The information processing device according to claim 1, wherein when the at least one character image extracted from the at least one original image comprises a plurality of character images, the setting means sets second scaling factors used to display the plurality of character images, and the adjusting means adjusts a display position of at least one of the plurality of character images changed in display size with the second scaling factors so that the plurality of character images changed in display size with the second scaling factors are positioned not to overlap.

3. The information processing device according to claim 2, wherein
the at least one original image comprises a plurality of original images,
the plurality of character images are extracted from the plurality of original images,
a plurality of background images are extracted from the respective plurality of original images, and
the adjusting means adjusts at least one first character image, among the plurality of character images changed in display size with the second scaling factors, so that the at least one first character image is positioned to partially extend out from an area for a first background image corresponding to the first character image, among the plurality of background images changed in display size with the first scaling factor, and adjusts a display position of at least either the first character image or a second character image corresponding to a second background image different from the first background image, among the plurality of background images changed in display size with the first scaling factor, so that the first and second character images do not overlap.

4. The information processing device according to claim 1, wherein
when the at least one character image extracted from the at least one original image comprises a plurality of character images, the setting means sets second scaling factors used to display the plurality of character images, and
when the at least one character image extracted from the at least one original image comprises the plurality of character images and two or more of the plurality of character images changed in display size with the second scaling factors overlap, the adjusting means makes display timings of at least the two or more character images different from each other.

5. The information processing device according to claim 2, wherein
when the at least one character image extracted from the at least one original image comprises the plurality of character images and two or more of the plurality of character images changed in display size with the second scaling factors overlap, the adjusting means makes display timings of at least the two or more character images different from each other.

6. The information processing device according to claim 3, wherein
when the at least one character image extracted from the at least one original image comprises the plurality of character images and two or more of the plurality of character images changed in display size with the second scaling factors overlap, the adjusting means makes display timings of at least the two or more character images different from each other.

7. The information processing device according to claim 1, wherein the adjusting means increases a difference in color between an edge of the at least one character image changed in display size with the second scaling factor and a portion adjoining the edge in the at least one background image changed in display size with the first scaling factor.

8. The information processing device according to claim 1, further comprising
second adjusting means for adjusting a thickness of characters shown by the at least one character image changed in display size with the second scaling factor, based on at least either an area of a region enclosed by the at least one character image changed in display size with the second scaling factor or a relationship between an area and an outline length of the at least one character image changed in display size with the second scaling factor.

9. The information processing device according to claim 1, wherein
when a size of characters shown by the at least one character image extracted from the at least one original image is less than a reference value, the setting means sets the second scaling factor to a scaling factor that makes the size of the characters greater than or equal to the reference value.

10. The information processing device according to claim 1, further comprising
display control means for causing the at least one original image to be resized and displayed on a display device,
wherein the at least one original image is resized and displayed in a way that the at least one character image changed in display size with the second scaling factor is overlaid on the at least one background image changed in display size with the first scaling factor and at least either the at least one character image or the at least one background image is adjusted by the adjusting means.

11. An information processing method performed by a computer, the method comprising:
setting a second scaling factor used to display at least one character image extracted from at least one original image, the second scaling factor being different from a first scaling factor used to display at least one background image extracted from the at least one original image; and
adjusting at least either the at least one character image changed in display size with the second scaling factor or the at least one background image changed in display size with the first scaling factor, based on a relationship between a display state of the at least one character image changed in display size with the second scaling factor and a display state of a surrounding area of the at least one character image changed in display size with the second scaling factor, the at least one character image changed in display size with the second scaling factor being overlaid on the at least one background image changed in display size with the first scaling factor.

12. A non-transitory computer readable medium storing thereon an information processing program, the information processing program causing a computer to function as:
setting means for setting a second scaling factor used to display at least one character image extracted from at least one original image, the second scaling factor being different from a first scaling factor used to display at least one background image extracted from the at least one original image; and adjusting means for adjusting at least either the at least one character image changed in display size with the second scaling factor or the at least one background image changed in display size with the first scaling factor, based on a relationship between a display state of the at least one character image changed in display size with the second scaling factor and a display state of a surrounding area of the at least one character image changed in display size with the second scaling factor, the at least one character image changed in display size with the second scaling factor being overlaid on the at least one background image changed in display size with the first scaling factor.

* * * * *